United States Patent [19]
Gummerson

[11] Patent Number: 5,771,672
[45] Date of Patent: *Jun. 30, 1998

[54] LATERALLY AND VERTICALLY MOVABLE GRASS CUTTING MOWER ATTACHMENT

[76] Inventor: Elwyn Gummerson, R.R. #2, Tavistock, Ontario, Canada, N0B 2R0

[ * ] Notice: The term of this patent shall not extend beyond the expiration date of Pat. No. 5,483,789.

[21] Appl. No.: 582,157

[22] Filed: Jan. 2, 1996

Related U.S. Application Data

[63] Continuation-in-part of Ser. No. 231,132, Apr. 22, 1994, Pat. No. 5,483,789.

[51] Int. Cl.$^6$ ............................ A01D 34/64; A01D 34/82
[52] U.S. Cl. ............................. 56/15.4; 56/15.5; 56/15.8
[58] Field of Search ..................... 56/15.4, 15.5, 56/15.6, 15.7, 15.8, 15.9, 15.2

[56] References Cited

U.S. PATENT DOCUMENTS

| | | | |
|---|---|---|---|
| 2,601,366 | 6/1952 | Chapman | 143/43 |
| 2,662,561 | 12/1953 | Duncan, Jr. | 143/43 |
| 2,699,635 | 1/1955 | Burton | 56/25 |
| 2,840,974 | 7/1958 | Dunn et al. | 56/25 |
| 2,997,835 | 8/1961 | Stewart | 56/2 |
| 3,003,299 | 10/1961 | Smith et al. | 56/25.4 |
| 3,061,996 | 11/1962 | Ripps | 56/25 |
| 3,063,226 | 11/1962 | Pfauser | 56/25.4 |
| 3,274,762 | 9/1966 | Jolls | 56/25.4 |
| 3,750,377 | 8/1973 | Clark | 56/10.4 |
| 4,206,580 | 6/1980 | Truax et al. | 56/10.4 |
| 4,518,043 | 5/1985 | Anderson et al. | 65/2 |
| 4,697,405 | 10/1987 | DeWitt et al. | 75/18 |
| 4,747,255 | 5/1988 | Roden | 75/18 |
| 4,893,456 | 1/1990 | Wallace | 56/15.5 |
| 4,901,508 | 2/1990 | Whatley | 38/86 |
| 5,035,107 | 7/1991 | Scarborough | 34/66 |
| 5,425,224 | 6/1995 | Downey et al. | 56/15.8 |

*Primary Examiner*—Terry Lee Melius
*Attorney, Agent, or Firm*—Martin J. Marcus

[57] ABSTRACT

A transversely-mounted grass cutter mower combination with a vehicle is provided which is adapted to be activated to move laterally to the right or to the left with respect to its mounting to the vehicle and/or to move vertically up or down with respect to its mounting the vehicle. The vehicle is a motor-driven vehicle having front wheels and rear wheels and a longitudinally-extending frame bed therebetween. A transversely-mounted powered grass-cutting mower, having a mower housing and powered grass cutting blades which is mounted to the frame bed by means of a suspended mounting system. The suspended mounting system includes a cooperative linkage which is secured between the longitudinally-extending frame bed of the motor-driven vehicle and the mower housing. A first powered operator is provided for moving the mower housing, in cooperation with the constraints provided by the cooperative linkage, through an infinite number of vertical locations between an upper limit and a lower limit. A second powered operator means is provided for moving the mower housing, in cooperation with the constraints provided by the cooperative, controlled guidance means, through an infinite number of lateral locations between a left lateral limit and a right lateral limit.

46 Claims, 19 Drawing Sheets

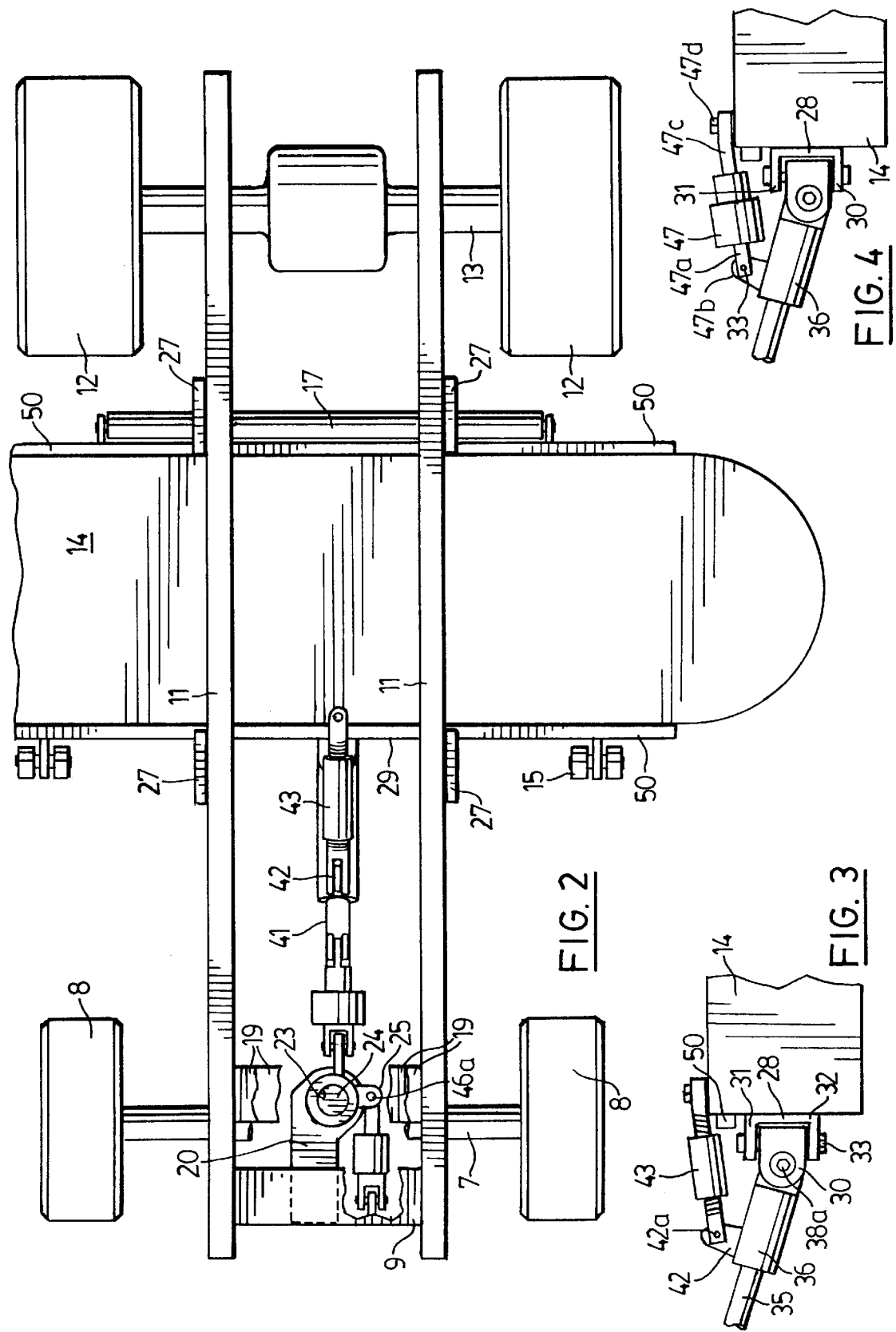

LATERALLY AND VERTICALLY MOVABLE GRASS CUTTING MOWER ATTACHMENT

RELATED INVENTION (i) This application is a continuation-in-part of application Ser. No.: 08/231,132 filed Apr. 22, 1994, (now allowed as U.S. Pat. No. 5,483,789), the entire contents of which are incorporated herein by reference.

2) BACKGROUND OF THE INVENTION (ii) Field of the Invention

This invention relates to a grass cutting mower attachment for a vehicle, the grass cutting mower attachment being operated to move quickly laterally to the right or to the left of the vehicle and/or up or down vertically with respect to the vehicle.

(iii) Description of the Prior Art

Up to the present time the most versatile grass cutting machines require the operator to move the complete vehicle in a series of manoeuvres around obstacles. This constant manoeuvring can be nauseating, tiring and time consuming. There are now a number of mower devices which have been adapted for mounting on vehicles and include some form of retraction and extension apparatus for moving the mowers or saws towards and away from the vehicle. Some such retractable mower devices are shown in U.S. Pat. No. 2,719,081, issued to Allen et al, U.S. Pat. No. 2,662,561, issued to Duncan, U.S. Pat. No. 2,699,635, issued to Burton, U.S. Pat. No. 2,601,366, issued to Chapman, U.S. Pat. No. 3,003,299, issued to Smith et al, U.S. Pat. No. 3,061,996 issued to Ripps, U.S. Pat. No. 3,274,762 issued to Jolls, U.S. Pat. No. 4,048,789, issued to Cartner, U.S. Pat. No. 2,997,835, issued to Stewart, U.S. Pat. No. 2,840,974 issued to Dunn et al, and U.S. Pat. No. 4,206,580 issued to Truax et al. The mowers of the patents issued to Allen, Duncan, Burton, Chapman, and Smith are equipped with mechanical retraction devices, and the mowers shown in the patents issued to Ripps, Jolls, Cartner, Stewart, Dunn, and Truax are equipped with hydraulic retraction mechanisms.

In U.S. Pat. No. 3,063,226 issued to E. M. Pfauser, a riding type rotary mower was disclosed, which had the housing of a rotary cutting unit suspended beneath the mower by means including a parallel linkage arrangement. That mower was said to be capable of traversing uneven terrain, and for this purpose, runners were provided at the edges of the housing to lift the cutter housing when a runner rode over a mound. The drive shafts to the rotary mower blades were provided with splines so that, as the housing was raised, the drive shafts telescoped. Also, the axes of the links of the parallel suspension linkage were set at an angle with the vertical of approximately 70° which permitted slight rearward movement of the cutter housing as the housing was raised. The suspension mechanism of such rotary mower structure was designed to elevate the cutter unit, but could not displace it rearwardly because the couplings and the linkage accommodated only slight rearward movement.

U.S. Pat. No. 4,518,043 patented May 21, 1985 by J. F. Anderson et al provided a retractable in-row tiller device that had a parallelogram carriage structure for supporting the outrigger arm and tiller and for retracting and extending the outrigger arm and tiller in relation to the tractor on which it was mounted. It also included an electro-hydraulic control system with a single wand plant feeler device that provided automatic control to guide the tiller around plants. It also included an automatic positive depth control feature operated electro-hydraulically by a gauge wheel.

U.S. Pat. No. 4,697,405 disclosed a multi-blade cutting head supported by a tractor-towed trailer which moved along and was guided by a guard rail for mowing thereunder. Telescoping and pivoting arms, extending above and beyond the upper limit of the guard rail, supported a mowing head which was rotatable about a vertical axis when it encountered a guard rail post.

U.S. Pat. No. 3,750,377 patented Aug. 7, 1973 by J. R. Clark provided a weed cutting attachment secured to a tractor angled at approximately 45° with respect to the direction of travel, which rode beneath the surface of the soil for cutting the weeds. A plurality of these blades was equi-angularly disposed about a rotatably positionable platform. The platform was angled with respect to horizontal such that only one blade was in contact with the soil at any one position of the platform. A feeler extended forwardly of the platform to detect any trees in the path of the cutting blade. Upon detection of a tree, the feeler tripped a release mechanism, which permitted the platform to rotate due to the drag of the embedded blade. Rotation of the platform caused the then embedded blade to rotate and rise above the soil. Simultaneously, another of the cutting blades came into contact with the soil and embedded itself to resume the weed cutting function. During the rotation of the platform, the position of the tree with respect to the moving platform was such that the cutting blades passed on either side of the tree.

U.S. Pat. No. 4,747,255 patented May 31, 1988 by R. Roder provided an agricultural mower which included a parallel linkage suspension mechanism for the cutter assembly, the suspension mechanism including swing arms which, in the use position, were substantially vertically-oriented, enabling the cutter assembly, upon striking an object, to respond by moving rearwardly relative to the forwardly travelling main frame. Then, as the pendulum action continued, the cutter assembly was elevated above the obstruction to a clearing height.

U.S. Pat. No. 4,901,508 patented Feb. 20, 1990 by D. L. Wheatly provided a mower for mowing vegetation under a fence which was supported above the surface of the earth by a series of spaced posts. The mower included a horizontal boom which was connected at one end with a prime mower and which supported a mowing head at its other end. The mowing head was pivotal about vertical and horizontal axes so that when the mowing head contacted one of the fence posts, the mowing head pivoted around the position of the post while being drawn by the prime mover in a forward direction. The mowing head was angularly tilted vertically for mowing a fence row or other surface on an incline with respect to the surface of the earth supporting the prime over.

U.S. Pat. No. 5,035,107 patented Jul. 30, 1991 by J. H. Scarborough provided a rotary lawn mower having a trimming attachment for trimming around fence posts. The trimming attachment assembly included an auxiliary trimming blade mounted in a housing and attached to a swing arm assembly, mounted on the primary mower housing. In the forward position, the trimming attachment extended outwardly from, but slightly overlapped, the mowed path of the primary mower. As a fence post adjacent the primary mower was encountered by the trimming attachment assembly, the trimming attachment assembly was pushed rearwardly by the obstruction and swung into the mowed path of the primary mower, during which process the grass near the fence post was cut. As the fence post or other object was passed, an actuator assembly forced the trimming assembly back into its original forward auxiliary cutting position.

The invention disclosed and claimed in the above-identified parent application, namely Ser. No.: 08/231,132 (now allowed), provided the combination of a motor-driven vehicle having front wheels and rear wheels and a longitudinally-extending frame bed therebetween, and a transversely-mounted powered grass-cutting mower having a housing and powered grass cutting blades which was mounted to the frame bed by means of a suspending mounting system. Such mounting system included a transversely-mounted track which was pivotally-secured by a parallelogram linkage to the longitudinal chassis of the motor-driven vehicle. The track included a first powered operator for moving the transversely-mounted track, and thus the mower housing, through an infinite number of vertical locations between an upper limit and a lower limit. The track also included a roller on the mower housing which was rollingly operatively associated with the transversely-mounted track on the mower housing, and a second powered operator for moving the mower housing by way of a linkage connected to the mower housing through an infinite number of lateral locations between a left lateral limit and a right lateral limit.

3) DESCRIPTION OF THE INVENTION (i) Aims of the Invention

In spite of these prior patents, and the above-identified parent application, there is still a need for various alternative embodiments of a grass mower suspended attachment which is capable of attaining at least one of the following objects: allowing the operator to trim grass closely around trees, shrubs, buildings and the like, while still allowing the vehicle to travel in a relatively straight track across the turf; allowing the operator to cut a grass pattern with sharp 90 degree turns even though the supporting vehicle may only have a minimum turning radius; allowing the operator to move between narrow obstacles that would otherwise be impossible with other horizontally-fixed grass cutting machines; providing a vehicle which is capable of supporting a grass cutting attachment below the waste area, and between the front and rear axle of the vehicle, or ahead of the front axle of the vehicle, or to the right or left side of the vehicle; providing a cutting attachment which is supported and carried by any suitable attaching linkage arrangement that will allow the cutting attachment to shift horizontally, to the right and/or left of the vehicle, while the cutting attachment is in any vertical height relative to the supporting vehicle; providing a cutting machine which is also attached and carried by any suitable attaching linkage arrangement that will allow the cutting attachment to be lifted and lowered in a vertical direction, relative to the vehicle, while the cutting attachment is in any horizontal position relative to the supporting vehicle; providing a controlling mechanism that will quickly and effectively cause the grass cutting attachment to lift or to lower while the cutting attachment is in any horizontal position, as it relates to the supporting vehicle, by means of any suitable mechanical linkage arrangement, or any effective hydraulically-assisted mechanical linkage arrangement, or any combination of the above, and/or to shift laterally to the left or to the right of the supporting vehicle, by means of any suitable mechanical linkage arrangement, or any effective hydraulically-assisted mechanical linkage arrangement, or any effective electrically-assisted mechanical linkage arrangement, or any combination of the above.

(ii) Statement of Invention

The present invention provides the combination of a motor-driven vehicle having front wheels and rear wheels and a longitudinally-extending frame bed therebetween, and a transversely-mounted powered grass-cutting mower, the mower having a housing and powered grass cutting blades, the mower being mounted to the frame bed by means of a suspended mounting system. The suspended mounting system comprises: vertical, guidance means which are a component of the suspended mounting system, the vertical guidance means being secured between the longitudinally-extending frame bed of the motor-driven vehicle and the mower housing. Rigid linkage means are secured between the longitudinally-extending framed bed of the motor driven vehicle and the mower housing. A first powered operating means which is connected to the rigid linkage means, is provided for moving the mower housing, in through an a finite number of controlled, vertically-upwardly guided positions to a maximum upper position within the constraints of the vertical guidance means, and for moving the mower housing through a finite number of controlled, vertically-downwardly guided positions to a minimum lower position within the constraints of the vertical guidance means, the vertical locations thereby being between an upper limit and a lower limit. Horizontal guidance means are secured to the mower housing for guiding lateral movement of the mower housing relative to the longitudinally-extending frame, the lateral movement being between a left lateral limit and a right lateral limit. Finally, a second powered operating means which is operatively associated with the horizontal guidance means, is also provided for moving the mower housing, within the constraints of the horizontal guidance means, through an a finite number of positively-controlled lateral locations between the left lateral limit and the right lateral limit.

The present invention also provides a first embodiment of such combination in which the cooperative, controlled guidance means includes a pair of longitudinally-spaced-apart, vertically-depending guide arms which depend from an associated transversely-spaced-apart, longitudinally-extending rail which constitute the longitudinally-extending frame bed of the motor-driven vehicle. The cooperative, controlled guidance means further includes a supporting bracket which is spaced longitudinally from the guide arms. The first powered operating means comprises a first push-pull mechanism including a reciprocally-movable rod and an end which is fixed relative to the reciprocally-movable rod, the fixed end of such first push-pull mechanism being pivotally-secured to the bracket for arcuate, vertical rotation, the rod end thereof being pivotally-secured to a first operating mechanism which, in turn, is secured to the mower housing for moving the mower housing, in cooperation with the constraints provided by the guide arms, through an infinite number of vertical locations between and upper limit and a lower limit. [Powered operating means which are well known to those skilled in the art, e.g., hydraulic cylinders, pneumatic cylinders, vacuum cylinders, and electrical prime movers with a push-pull rod, can be secured to, and can cause the first operating mechanism to move the mower housing in the manner described.] The bracket also supports the second powered operating means. Such second powered operating means comprises a second push-pull mechanism including a reciprocally-movable rod and an end which is fixed relative to the reciprocally-movable rod, the fixed end of such second push-pull mechanism being pivotally-secured to the bracket for vertical movement relative thereto, the rod end of such second push-pull mechanism being pivotally-secured to a second operating mechanism which, in turn, is pivotally-secured to the mower housing for moving the mower housing, in cooperation with the constraints provided by the guide arms through an infinite number of lateral locations between a left lateral limit and a right lateral limit. [Powered operating means, which are well known to those skilled in the art, e.g., hydraulic cylinders, pneumatic cylinders, vacuum cylinders, and electrical prime movers with a push-pull rod, can be secured to, and can cause the second operating mechanism to move the mower housing in the manner described.]

The present invention also provides a second embodiment of such combination in which the cooperative, controlled guidance means includes the further combination of a transverse bar which is disposed between the pair of transversely-spaced-apart, longitudinally-extending rails which constitute the longitudinally-extending frame bed of the motor-driven vehicle, and a plate which is secured to the mower housing. The cooperative, controlled guidance means further includes a pair of brackets, each bracket depending from an associated rail, and a pair of link arms, each link arm being connected to an associated bracket. The first powered operating means comprises a first push-pull mechanism including a reciprocally-movable rod and an end which is fixed relative to the reciprocally-movable rod, the fixed end of such first push-pull mechanism being pivotally-secured to the transverse bar, the rod end of such first push-pull mechanism being pivotally-secured to the top of the plate. A forward edge of the mower housing constitutes another link arm connection between the upper portion of the bracket and the rear edge of the mower housing plate. The first push-pull mechanism is operative to move the mower housing, in cooperation with the constraints provided by the cooperative, controlled guidance means, through an infinite number of vertical locations between an upper limit and a lower limit. [Powered operating means, which are well known to those skilled in the art, e.g., hydraulic cylinders, pneumatic cylinders, vacuum cylinders, and electrical prime movers with a push-pull rod, can be secured to, and can cause a first operating mechanism to move the mower housing in the manner described.] The second powered operating means comprises a second push-pull mechanism including a reciprocally-movable rod and an end which is fixed relative to the reciprocally-movable rod, the fixed end thereof being pivotally-secured to one laterally-extending rail, the rod end thereof being pivotally-connected to the mower housing. Relatively slidable means are disposed between the mower housing and the plate to assist in relative transverse movement between the mower housing and the plate. Actuation of the second push-pull mechanism moves the mower housing, in cooperation with the constraints provided by the relatively slidable means, through an infinite number of lateral locations between a left lateral limit and a right lateral limit. [Powered operating means, which are well known to those skilled in the art, e.g., hydraulic cylinders, pneumatic cylinders, vacuum cylinders, and electrical prime movers with a push-pull rod, can be secured to, and can cause a second operating mechanism to move the mower housing in the manner described.]

The present invention also provides a third embodiment of such combination in which the cooperative, controlled guidance means includes the combination of a laterally outwardly and downwardly depending ear which is secured to one of the transversely-spaced apart, longitudinally extending rails constituting the longitudinally-extending frame bed of the motor-driven vehicle, and a plate secured to the mower housing as well as a pair of brackets, each of said brackets depending from an associated one of the longitudinally extending rails. The first powered operating means depends from the brackets and comprises a prime mover which is operatively connected to a drive gear, the drive gear being in mesh with a vertical gear rack which, in turn, is operatively associated with the mower housing. Actuation of the prime mover is operative to move the mower housing, in cooperation with the constraints provided by the cooperative, controlled guidance means, through an infinite number of vertical locations between an upper limit and a lower limit. [Powered operating means, which are well known to those skilled in the art, e.g., electric motors, hydraulic motors, pneumatic motors, internal combustion motors, diesel motors, or hydraulic cylinders, pneumatic cylinders, or vacuum cylinders, which translates longitudinal motion into rotary motion, can be secured to, and can cause a first operating mechanism to move the mower housing in the manner described.] The second powered operating means comprises a push-pull mechanism including a reciprocally-movable rod and an end which is fixed relative to the reciprocally-movable rod, the fixed end being pivotally-secured to the ear, the rod end thereof being pivotally-connected to the mower housing. Relatively slidable means are disposed between the mower housing and the plate to assist in relative transverse movement between the mower housing and the frame. Actuation of the push-pull mechanism moves the mower housing, in cooperation with the constraints provided by the relatively slidable means, through an infinite number of lateral locations between a left lateral limit. Powered operating means, which are well known to those skilled in the art, e.g., hydraulic cylinders, pneumatic cylinders, vacuum cylinders, and electrical prime movers with a push-pull rod,can be secured to, and can cause a second operating mechanism to move the mower housing in the manner described.

The present invention also provides a fourth embodiment of such combination in which the cooperative, controlled guidance means includes the combination of two cross-bars, each of which being disposed between the pair of transversely-spaced-apart, longitudinally-extending rails which constitute the longitudinally-extending frame bed of the motor-driven vehicle, and two slewably-mounted brackets, one such slewably-mounted bracket being operatively-associated with an associated such cross-bar. The first powered operating means comprises a pair of transversely-spaced-apart, first push-pull mechanisms of each such first push-pull mechanisms including a reciprocally-movable rod and an end which is fixed relative to the reciprocally-movable rod, the fixed end of each of such first pair of push-pull mechanisms being pivotally-connected to an associated bracket, the rod end of each of such first pair of push-pull mechanisms being pivotally-connected to an associated linkage arm, each such linkage arm being pivotally-connected at one end to an associated one of such brackets, and at the other end to a lateral edge of the mower housing. Actuation of the first pair of push-pull mechanisms causes vertical guided movement of the mower housing in cooperation with the constraints provided by the cooperative guidance means through an infinite number of vertical locations between an upper limit and a lower limit. [Powered operating means, which are well known to those skilled in the art, e.g., hydraulic cylinders, pneumatic cylinders, vacuum cylinders, and electrical prime movers with a push-pull rod, can be secured to, and can cause a first operating mechanism to move the mower housing in the manner described.] The second powered operating means comprises a second push-pull mechanism including a reciprocally-movable rod and an end which is fixed relative to the reciprocally-movable rod, the fixed end thereof being pivotally-secured to one of such cross-bars for rotational movement relative thereto, the rod end thereof being pivotally-secured to one of the linkage arms. Actuation of the second push-pull mechanism moving the mower housing, in cooperation with the constraints provided by the two pivotally-secured linkage arms, through an infinite number of lateral locations between a left lateral limit and a right lateral limit. [Powered operating means which are well known to those skilled in the art, e.g., hydraulic cylinders, pneumatic cylinders, vacuum cylinders, and electrical prime movers with a push-pull rod, can be secured, and can cause a second operating mechanism to move the mower housing in the manner described.]

The present invention also provides a ground-engaging shoe assembly for a power mower in which the mower blade is rotated in respect to an upright shaft. The ground engaging shoe includes a hub support assembly which is secured to the mower housing of the power mower and a hollow rotatable shaft to which the mower blade is secured. A ground engaging shoe assembly is secured to the lower end of the hollow shaft. That assembly includes a bearing within which the hollow shaft rotates, so that such assembly remains stationary. A housing is adapted selectively to accept different ground-engaging shoes. An adjusting bolt extends through the hollow shaft and is secured at its lower end to the ground engaging shoe assembly. An upper tower housing is adapted to transfer body weight through the adjusting bolt to the bearing. The adjusting bolt is vertically-adjustably-secured at its upper end with respect to the upper tower housing.

(iii) Features of the Invention

By a feature of a first embodiment of this invention, the rod end of the first push-pull mechanism is pivotally-connected to an ear of a central arm which, in turn, is pivotally-secured to the mower housing. By another feature of this first embodiment of this invention, the pivotal securement of the central arm to the mower housing comprises a shackle which is secured in a vertical orientation to the transversely-extending edge of the mower housing, and an ear extending from the central arm, with a vertically-extending bolt passing through aligned apertures in the shackle and the ear. By another feature of this first embodiment of this invention, the central arm is a two-part telescopic outer arm and inner arm, which are interconnected non-rotationally to one another and are adapted to allow the mower housing to adopt a true lateral movement within the constraints provided by the guide arms compared to an arcuate movement. By another feature of this first embodiment of this invention, the cooperative, controlled guidance means includes an adjustable link between the shackle and an ear on the outer arm of the two-part arm, e.g., where the adjustable link may be a turnbuckle, or may be a third push-pull mechanism including a reciprocally-movable rod and an end which is fixed relative to the reciprocally-movable rod.

By yet another feature of this first embodiment of this invention, the cooperative controlled guidance means includes a depending bracket and a post upstanding therefrom, and the rod end of the second push-pull mechanism is pivotally-connected to an ear which is an extension of a cylindrical member, such cylindrical member being concentrically disposed around the post, the cylindrical member being adapted to be rotated relative to the post. By another feature of this first embodiment, the rod end of the first push-pull mechanism is pivotally-connected to an ear of the outer arm of the two-part arm, the arm being pivotally-secured to the mower housing.

By still another feature of this first embodiment of this invention, the outer cylindrical member includes a second arm extension which is pivotally-connected to a central arm which, in turn, is pivotally-connected to the outer arm of the two-part arm. By another feature of this first embodiment of this invention, the rod end of the second push-pull mechanism is pivotally-connected to an ear of a central arm which, in turn, is pivotally-secured to the mower housing.

By a feature of a second embodiment of this invention, the cooperative, controlled guidance means also includes a parallelogram linkage comprising two pairs of brackets, each of the four brackets depending downwardly from an associated one of the laterally-extending rails, two pairs of ears upstanding from the plate, and linkage arms interconnecting associated brackets and ears. By another feature of this second embodiment of this invention, a lug upstands from the plate to which the rod end of the first push-pull mechanism is pivotally attached. By another feature of this second embodiment of this invention, the fixed end of the second push-pull mechanism is pivotally-connected to an ear which extends laterally- and angularly-downwardly from one of the longitudinally-extending rails, and the rod end of the second push-pull mechanism is pivotally-connected to an ear which is upstanding from a lateral edge of the mower housing which is remote from the laterally- and angularly-downwardly depending ear. By still another feature of this second embodiment of this invention, lateral edges of the mower housing are provided with securing means, where such securing means attaching a first cable which is entraining around one pulley which is mounted on a rotary shaft of a motor and a second cable which is entrained around a second pulley which is mounted on the shaft of the rotary motor, or where one said securing means attaches one end of a drive chain which entrains respectively, a first idler sprocket, a drive sprocket which is splined to a rotary shaft of a motor, a second idler sprocket, and is then attached to the other securing means.

By another feature of this second embodiment of this invention, the relatively-slidable means comprises four pulleys, one of such pulleys being freely rotatably and dependently mounted at a respective corner of a block for free-wheeling travel on a pair of longitudinally-spaced-part, inverted "L-shaped" and/or stepped-shaped tracks which are upstanding from lateral edged of the mower housing. By another feature of this second embodiment of this invention, a pair of U-shaped sliders of low friction material, each of such sliders being dependently mounted to a respective lateral edge of the plate, and a pair of longitudinally-spaced-apart, inverted "L-shaped" and/or stepped shaped slide bars which are in sliding cooperative relationship to an associated slider. By another feature of this second embodiment of this invention, a pair of longitudinally-spaced-apart, C-shaped slide blocks which are upstanding from the mower housing, and which are in sliding cooperative relationship to a lateral edge of the plate and/or to a slider which is dependently secured from a lateral edge of the plate. By another feature of this second embodiment of this invention, a pair of wheels, each wheel being rotatably-mounted to an associated lateral edge of the plate, and which are laterally extending towards, and being captured within, spaced-apart slide C-rails which are upstanding from the mower housing and which are in relatively movable cooperative enclosing relationship to an associated wheel. By another feature of this second embodiment of this invention, a pair of spaced-apart bogey wheels, each such pair of bogey wheels upstanding from an associated lateral edge of the plate, and spaced-apart inverted C-rails which are upstanding from the mower housing and which are in relatively movable, cooperative enclosing relationship to an associated pair of such spaced-apart bogey wheels. By another feature of this second embodiment of this invention, a pair of globular sliders, each of such globular sliders being formed of low friction material and being mounted to an associated lateral edge of the plate, and which are laterally extending from spaced-apart slide C-rails which are upstanding from the mower housing towards, and being captured within, and being in cooperative enclosing relatively slidable relationship to an associated one of the globular sliders. By another feature of this second embodiment of this invention, a pair of globular sliders, each such globular slider being formed of low friction material and upstanding from an associated lateral edge of the plate, and a pair of spaced-apart, inverted C-rails, each of which is upstanding from an associated lateral edge of the mower housing, the rails being in cooperative enclosing relatively slidable relationship to an associated globular slider. By another feature of this second embodiment of this invention, two pairs of vertically spaced-apart wheels, each such pair of wheels being rotatably secured to a respective lateral edge of the plate, and stepped-shaped slide rails, each of which is upstanding from a lateral edge of the mower housing and which are in cooperative relationship to the associated such vertically spaced-apart wheels, and also including a pair of lateral guide wheels, each such guide wheel being rotatable about a vertical axis and being in rotational cooperation with a lateral face of an associated such stepped-shaped rail.

By one feature of the third embodiment of this invention, the cooperative, controlled guidance means also includes a pair of transversely spaced-apart brackets, each of such brackets depending from an associated transversely-spaced-apart longitudinally-extending rail, each of the brackets including a vertically-extending slot which is operatively connected to slider means which are operatively associated with the rail, whereby the first push-pull mechanism is operative to move the mower housing in cooperation with the constraints provided by the vertically-extending slots in the brackets through an infinite number of vertical locations between an upper limit and a lower limit.

By other features of a third embodiment of this invention, the relatively slidable means comprises: a pulley mounted for free wheeling travel upon the vertical flanges of a C-shaped track forming the rail, the pulley including a projecting rod which is freely vertically slidable in the vertical slots in the brackets, or a block having a guide wheel at each of the four corners thereof for relative following sliding movement with respect to the upper and lower longitudinally-extending edges of one arm at an H-shaped track forming the rail, the block including a projecting rod which is freely vertically slidable in the vertical slots in the brackets; or a block provided with an engaging surface of low friction material which is slidable within a C-shaped track forming the rail, the block including a projecting rod which is freely vertically slidable in the vertical slots in the brackets.

By a feature of this fourth embodiment of this invention, the rod end of the first push-pull mechanism is pivotally-connected to an ear on a central arm which is pivotally-secured to the mower housing. By another feature of this fourth embodiment of this invention, the pivotal securement of the central arm to the mower housing comprises a shackle which is secured in a vertical orientation to the transversely-extending edge of the mower housing, and an ear extending from the arm, with a vertically-extending bolt passing through aligned apertures in the shackle and the ear.

By another feature of the fourth embodiment of this invention, the cross-bar includes a pair of rods and each bracket includes a hollow cylindrical upright portion which is concentrically disposed around an associated such rod. By another feature of the fourth embodiment of this invention, the rearward edge of the mower housing is provided with a pair of laterally-spaced-apart, upstanding posts, each such post being fitted with a bracket, each of the brackets including an upright hollow cylindrical portion which is concentrically disposed around an associate post, each of such brackets including an ear to which the associated linkage arm is pivotally-secured.

By a feature of the ground engaging shoe assembly of the present invention, the hub support assembly is mounted on the interior of the mower housing; and/or wherein the hollow shaft is rotated by means of a drive belt pulley. By another feature of such ground-engaging shoe assembly, the ground-engaging shoe assembly includes a central upper well to accommodate the lower bearing. By another feature of such ground-engaging shoe assembly, the lower surface of the ground-engaging assembly comprises a low friction surface. By other features of such ground-engaging shoe assembly, the low friction surface is provided: on a disk-shaped horizontal, rotatable, ground engaging wheel, or is provided by a rectangular frame having a rotatable disk-shaped wheel with a rolled-up outer perimeter; or by a rectangular frame which supports a leading roller and a tracking roller which, in turn, supports and guides an endless low friction belt or track; or by a rectangular frame having a plurality of freely rotatable, ground-engaging wheels; or by a rectangular frame housing two outer rollers or drums which are adapted to guide and support a wide ground engaging belt track. By another feature of the ground-engaging shoe assembly, the ground-engaging shoe assembly is provided with a quick connect-disconnect attachment to permit different ground engaging shoes to be installed quickly.

By yet another feature of the ground engaging shoe of the present invention, such assembly is provided in the form of a multi-bladed power mower comprising a plurality of ground engaging shoe assemblies, where each ground engaging shoe assembly comprises the assembly as previously described hereinabove.

4) BRIEF DESCRIPTION OF THE DRAWINGS

In the accompanying drawings,

FIG. 2 is a top plan view of the embodiment shown in FIG. 1;

FIG. 3 is an enlarged view showing one mode for providing a fixed but variable relationship between the mower housing and the suspended mounting system;

FIG. 4 is an enlarged view showing an alternative mode for providing a fixed but variable relationship between the mower housing and the suspended mounting system;

5) DESCRIPTION OF THE PREFERRED EMBODIMENTS

Figure 1:
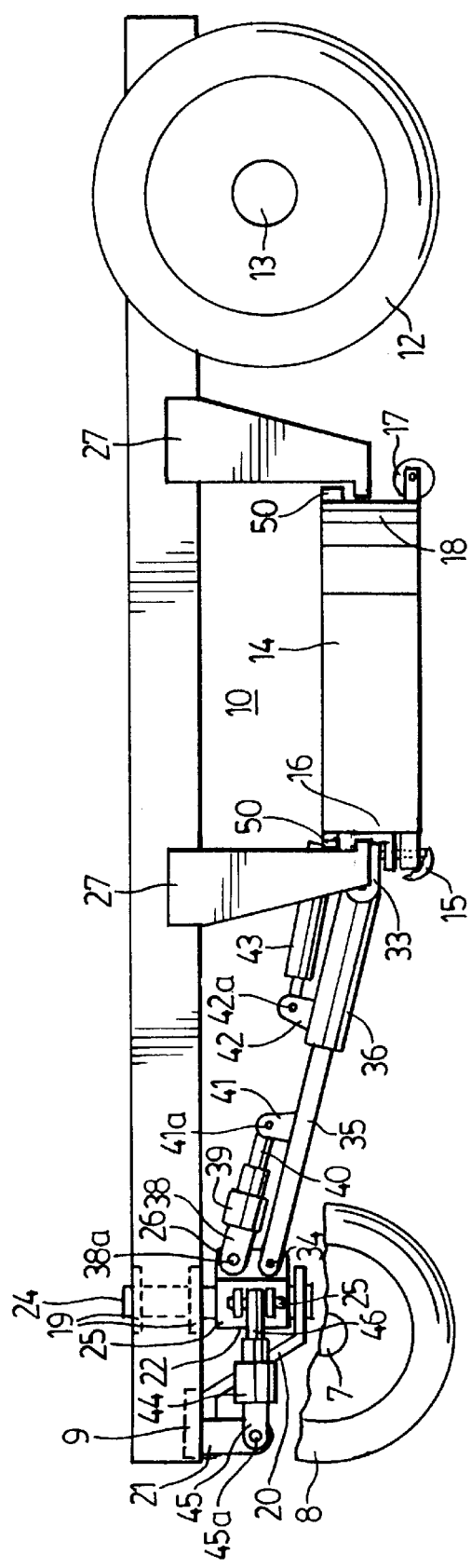
FIG. 1 is a side elevational view of a front-mounted embodiment of the suspended mounting system of the present invention for the mower housing.

(i) Description of FIGS. 1 to 4

Referring to FIGS. 1 to 4, the mower attachment is mounted on a conventional vehicle having a longitudinal body including longitudinally-extending rails 11, front steering wheels 8 and axle 7, rear driving wheels 12 and axle 13 and a sufficient bed area between the front axle 7 and the rear axle 13 to accommodate the mower housing and suspended system 10. A conventional design mowing attachment including a housing 14 is attached to the above-referred-to bed area in the manner to be described hereinafter, the mowing attachment and housing 14 having front lower roller wheels 15 mounted on lower forward housing area 16 and rear lower wheels 17 mounted on a lower rear housing area 18 to allow the mower housing 14 to ride over turf in order to prevent scalping.

The mower housing 14 is suspended from the longitudinal chassis 11 of the vehicle by a suspending mounting system 10 to be described hereinafter. Cross-bars 19 are mounted between the two longitudinally-extending chassis rails 11 adjacent the front axle 7. Depending from cross-bars 19 is a main support deck bracket 20 and a depending bracket 21.

Main support deck bracket 20 provides a pedestal to support a slewably-movable bracket 22. Bracket 22 has a hollow cylindrical portion 23 which is concentrically disposed around upstanding post 24. Bracket 22 includes two ears 25 projecting therefrom as well as an arm. 26 projecting therefrom, ear 25 and arm 26 being spaced 90° apart.

The suspending mounting system 10 also includes four depending guide arms 27 secured to the chassis rails 11. Guide arms 27 are both longitudinally and laterally spaced apart. The longitudinal spacing is sufficient to accommodate and guide the mower housing 14.

The mower housing 14 includes a forward shackle 28 secured to the mid-portion of the lateral leading edge 29 of the mower housing 14 (see FIGS. 3 and 4). The shackle 28 includes an ear 30 disposed between the upper arm 31 and the lower 32 arm of the shackle 28. An upright pin 33 passes through aligned apertures in the arms 31, 32 of the shackle 28 and the ear 30 so that the ear 30 is slewably-mounted to the shackle 28.

The lower portion of arm 26 pivotally supports a two-piece telescopic guide arm by pin 34, namely an inner arm 35 and an outer arm 36. Inner arm 35 and outer arm 36 are non-rotationally-associated with one another, but inner arm 35 is slidable within outer arm 36. [There are many ways, well known to those skilled in the art to provide such non-rotational association. Non-limiting examples thereof include splined cooperation, keyed cooperation or square cross-section or other geometric cross-section cooperation of the arms. All these alternatives are encompassed by this specification.] Outer arm 36 surrounds the inner arm 35 and is pivotally-secured to ear 30 by pin 37.

The upper portion of arm 26 pivotally supports the cylinder end 38 of a first cylinder 39 by pin 38a. [While throughout this specification reference is made to "cylinders" having "fixed ends" and "rod ends", any other prime mover mechanism can be provided to have a push-pull powered operating rod. This may be done, for example, by a pneumatic cylinder, or by means of a motor, (either electric, gasoline, diesel or hydraulic), fitted with suitable mechanism, well-known to those skilled in the art, to convert rotary motion to reciprocal motion. Accordingly, when the term "cylinder" is used it is to be interpreted as including such functional equivalents thereof.] The rod end 40 of the first cylinder 39 is pivotally-secured to an upstanding ear 41 on the inner arm 35 by pin 41a. An ear 42 upstanding from the outer arm 36 is pivotally-secured to adjustable turnbuckle 43 at pin 42a, which itself is held by pin 51 to the upper edge of mower housing 14. Adjustable turnbuckle 43 is used to adjust the level of the mower housing 14 relative to the ground. This is shown in FIG. 3.

Bracket 21 supports a second cylinder 44 by its fixed end 45 through pin 45a. The rod end 46 of second cylinder 44 is pivotally-secured to ears 25 by pin 46a.

In the embodiment shown in FIG. 4, the turnbuckle 43 has been replaced by a cylinder 47. The fixed end 47a is rotationally secured by pin 33 to ear 47b upstanding from arms 36. The rod end 47c is pivotally-secured by pin 47d to the upper forward edge of mower housing 14. Cylinder 47 may be controlled by a level sensing device (not shown) which may be mounted on the mower housing 14, automatically to correct the forward and horizontal rearward level of the mower housing 14.

Figure 5:
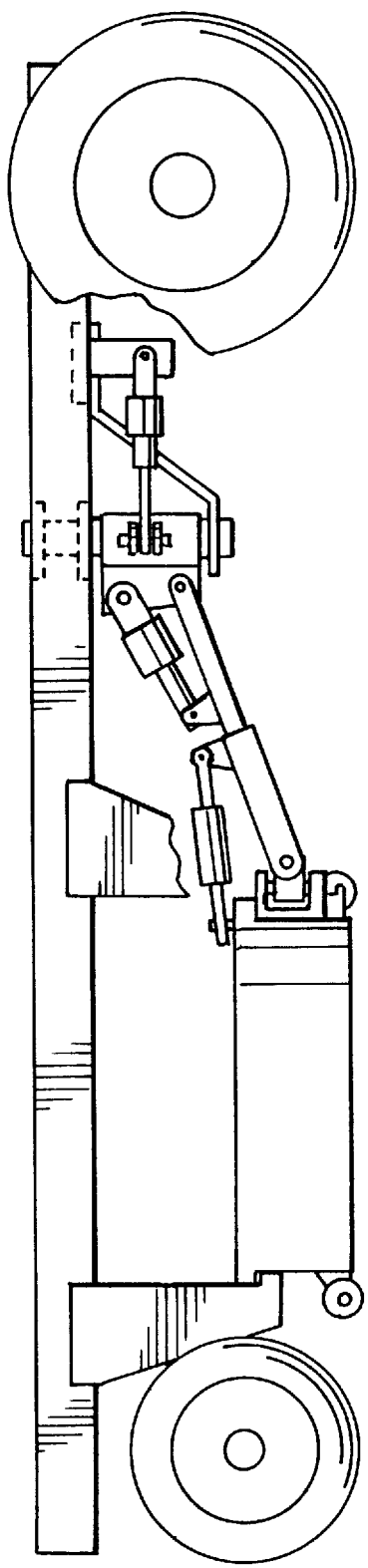
FIG. 5 is a side elevational view of a rear-mounted embodiment of the suspended mounting system of the present invention for the mower housing.
Figure 6:
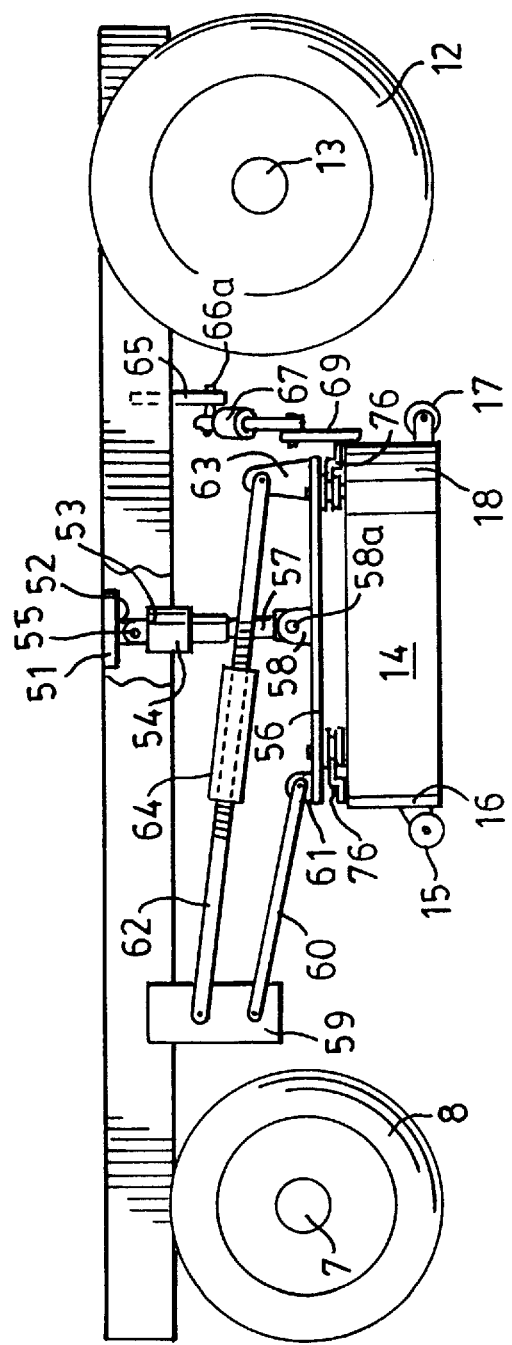
FIG. 6 is a side elevational view of another front-mounted embodiment of the suspended mounting system of the present invention for the mower housing.
Figure 7:
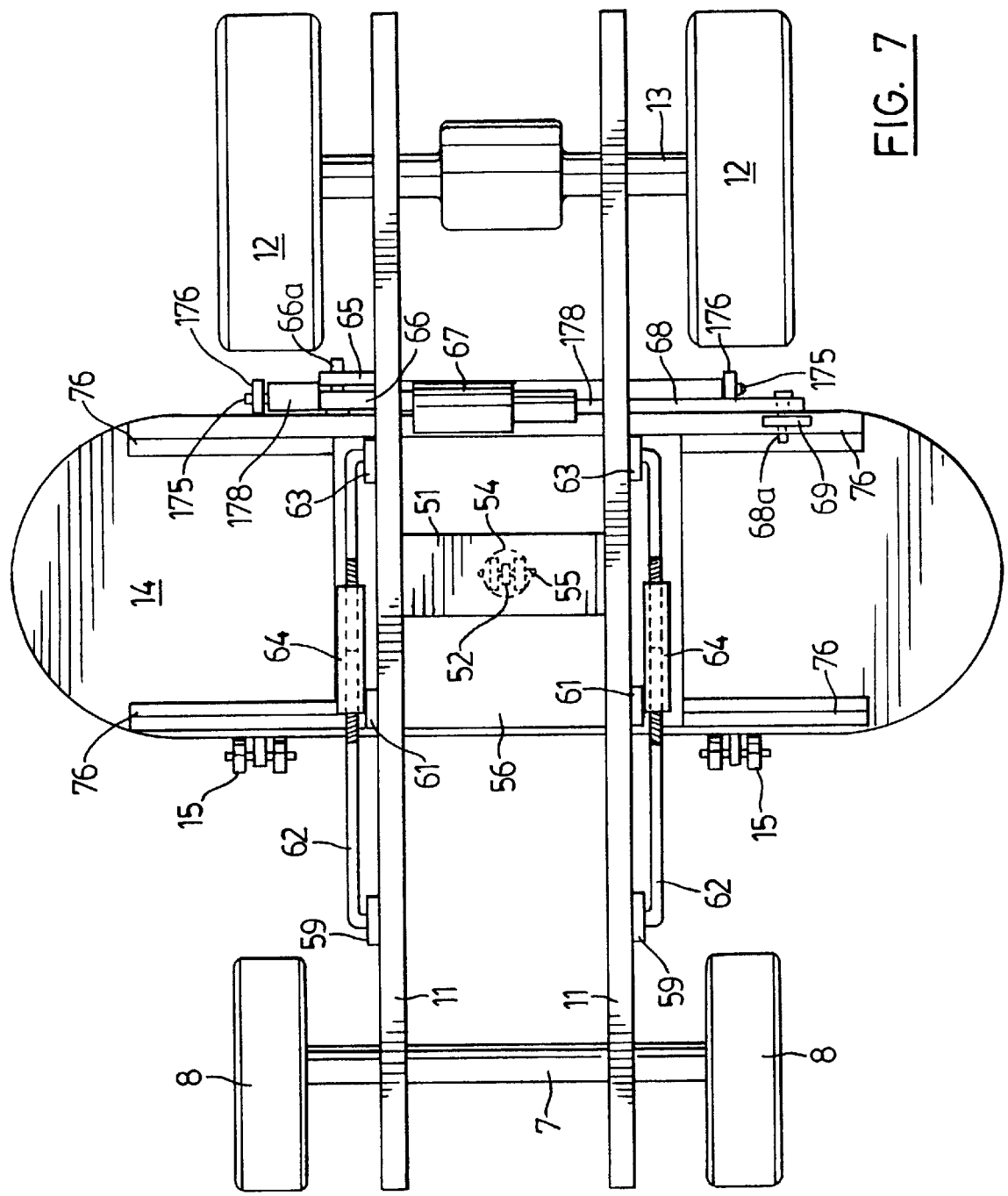
FIG. 7 is a top plan view of the embodiment shown in FIG. 6.

The embodiment shown in FIG. 5 is virtually the same as the embodiment shown in FIGS. 1–4, and so similar parts are numbered the same and no further description will be given. The major differences are in the location, i.e., adjacent the rear wheels 12 and rear axle 13 of the suspended mechanism. Additionally, as shown in FIG. 4, the turnbuckle which provided a fixed (but variable) relationship between the outer arm 36 and the mower housing 14 has been replaced by a cylinder 47.

In operation to provide vertical up-and-down motion, cylinder 39 is actuated to retract rod end 40 from the position shown in FIG. 1. This serves to raise arm 35, 36, which causes mower housing 14 to be elevated within the confines of the four guide arms 27. Actuation of the cylinder 39 to extend rod end 40 causes mower housing 14 to be lowered. Thus, the mower housing 14 can move vertically up and down, within the limits of the four guide arms 27. The mower is held rotationally stable during this vertical up-and-down motion by the telescoping tubular arms 35, 36. The prime mover power source 47 shown in FIG. 4 may be controlled by a levelling sensing device (not shown) and is operative to keep the mower housing 14 level while it is being raised and lowered.

To move the mower housing 14 laterally from left to right and vice versa, cylinder 44 is actuated to extend rod end 46. This causes bracket 22 to rotate in a counterclockwise direction. This in turn causes arms 35, 36 to rotate in a counterclockwise direction, thereby moving mower housing 14 to the top as shown in FIG. 2 (i.e. to the right) within the constraints of the four guide arms 37. Actuation of the cylinder to retract rod end 46 causes the mower housing 14 to move to the left.

(ii) Description of FIGS. 6 to 19

Referring to FIGS. 5–9, the mower attachment 14 is mounted on a conventional vehicle having a longitudinal body including longitudinally-extending rails 11, front steering wheels 8 and front axle 7, rear driving wheels 12, and rear axle 13, and a sufficient bed area between the front axle and rear axle 13 to accommodate the mower housing 14 and the suspended mechanism 50. A conventional design mower attachment including a housing 14 is attached to the above-identified bed area in the manner to be described hereinafter. In this particular case, the mower attachment and housing 14 has two pairs of wheels 15 mounted on lower forward housing area 16 and a rear lower transverse roller 17 (instead of wheels 17) mounted on lower rear housing area 18, to allow the mower housing 14 to ride over turf in order to prevent scalping.

The mower housing 14 is suspended from the longitudinal chassis 11 of the vehicle by a suspended mounting system 50. A cross-plate 51 is mounted between two longitudinally-extending chassis rails 11. Depending from cross-plate 51 is first ear bracket 52 by means of which the fixed end 53 of a first cylinder 54 is pivotally suspended by pin 55.

The mower housing 14 includes an upper plate 56 secured thereto in a manner that permits relative transverse guided substantially-frictionless movement between the plate 56 and the mower housing 14, in a manner to be described further with reference to FIGS. 8–15.

Figure 8:
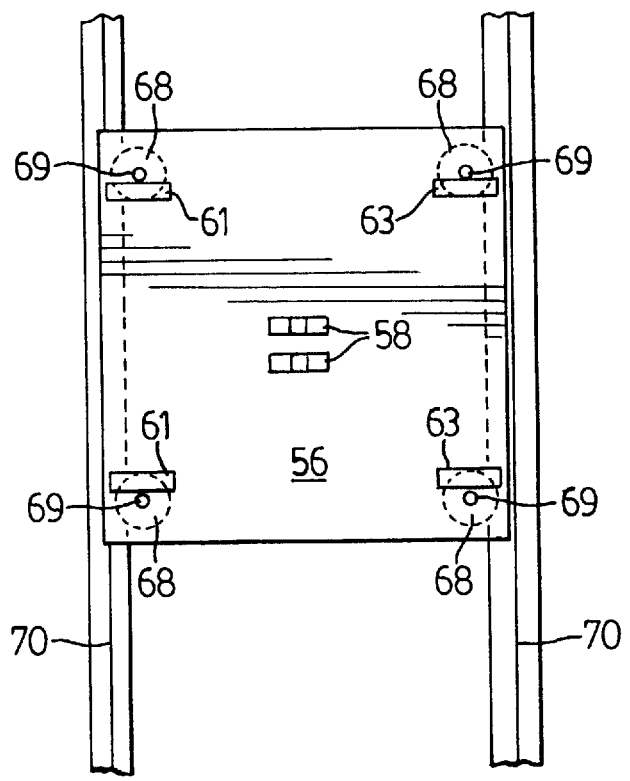
FIG. 8 is a top plan view of the upper plate of the mower housing, showing its cooperation with the longitudinal rails.

The rod end 57 of the cylinder 54 is pivotally-connected to a second clevis bracket 58 which is secured to the upper surface of plate 56 of mower housing 14 by means of pin 58a (See FIG. 8).

The suspended mounting system 50 also includes a pair of transversely-spaced-apart brackets 59, each depending from an associated chassis rail 11. The brackets 59 are connected to the plate 56 of the mower housing 14 by a parallelogram linkage. That parallelogram linkage includes short link arm 60 which is pivotally-connected at one end to one bracket 59 and which is pivotally-connected at its other end to a first upstanding ear 61 on the plate 56. The linkage also includes a long link arm 62 pivotally-connected at one end to the upper portion of bracket 59 and pivotally-connected to its other end to a second ear 63 upstanding from the plate 56. Long link arms 62 are constructed to be variable in length by virtue of the interconnecting turnbuckle 64.

This embodiment thus shows a vehicle with a power-driven mower mounted between the front and rear axles 7, 13. A simple but effective cooperative linkage arrangement consisting of parallel arms attached to frame brackets and upstanding ears on the plate. a first power means for lifting and a second power means for lateral movement are provided. If a horizontal levelling device arrangement were used, this mower housing would move in a true vertical and horizontal motion.

Actuation of the cylinder 54 to extend the rod 57 causes the mower housing 14 to move directly downwardly. Its movement is controlled to be purely vertical by the constraining action of the parallelogram linkage provided by arms 60, 62. Conversely, actuation of the cylinder 54 to retract the rod 57 causes the mower housing 14 to move directly upwardly. Again, pure vertical movement is provided by the constraining action of the parallelogram linkage, provided by arms 60, 62.

One of the chassis rails 11 is provided with a laterally outwardly and diagonally downwardly directed anchor bracket 65. The fixed end 66 of a second cylinder 67 is pivotally-connected to anchor bracket 65 at pin 66a. The rod end 68 of cylinder 67 is connected to upstanding ear 69 at one end of the leading edge of the mower housing 14 at pivot pin 68a.

Operation of cylinder 67 causes the mower housing 14 to move laterally with respect to the plate 56. Several mechanisms to be described hereinafter provide essentially friction-free such relative motion.

Figure 10:
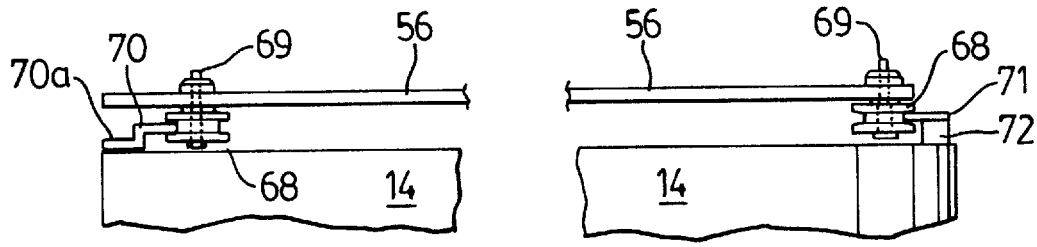
FIG. 10 is a side view of two alternative embodiments of the mechanism for allowing relative movement between the mower housing and the upper plate connected thereto, in the embodiment shown in FIG. 6.

Two such mechanisms are shown in FIG. 10. Here the lateral edges of the plate 56 adjacent the four corners are provided with pulleys 68, each mounted on pin axle 69 to be free-wheeling (see also FIG. 8). The leading and trailing edges of the mower housing 14 are fitted with transversely-extending rails to guide the pulleys 68 which, as shown in FIG. 8, are of two structures. One such rail 70, shown on the left hand side, is of stepped configuration and its base 70a is firmly secured to the upper surface of the mower housing 14 by conventional means. [These conventional "firmly securing means" are notoriously well known in the art and include such means as welding, the use of screws, nuts-and-bolts, rivets, etc. Accordingly, throughout this specification, Applicant will refer to such firmly securing means as "securing means".] Another such rail 71 is mounted on a bushing 72 and is secured to the upper surface of the mower housing 14. Identical or mixed such constructions (one of each on different lateral edges) may be provided.

Figure 9:
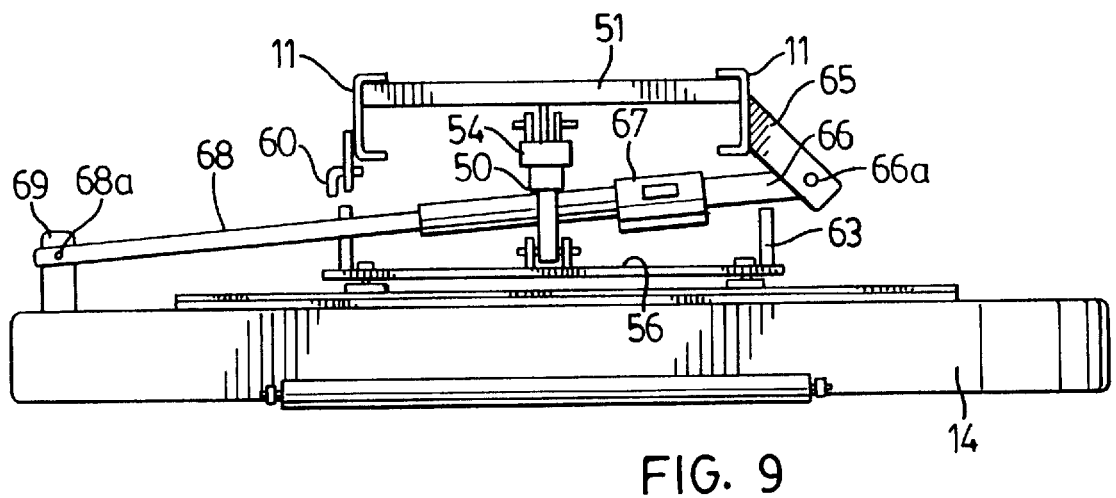
FIG. 9 is an end elevational view of the embodiment shown in FIG. 6.
Figure 11:
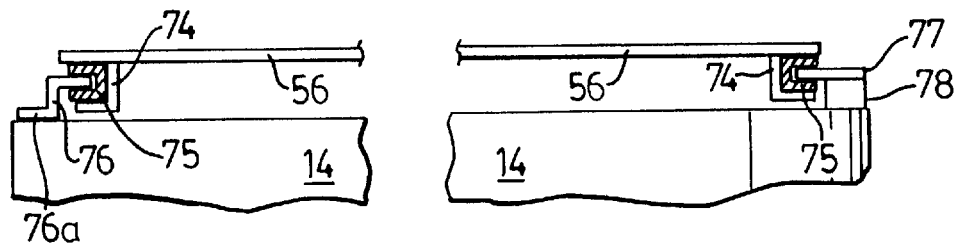
FIG. 11 is a side view of two further alternative embodiments of the mechanism for allowing relative movement between the mower housing and the upper plate connected thereto, in the embodiment shown in FIG. 6.

Two other such mechanisms are shown in FIG. 11. Here, the leading and trailing edges of the plate 56 are each provided with a U-shaped, outwardly facing bracket 74, secured by securing means. Bracket 74 embraces a U-shaped, outwardly-facing liner 75 of low friction material, one example of which is TEFLON™. The leading and trailing edges of the mower housing 14 are each fitted with transversely-extending rails to be embraced by the liners 75 which, as shown in FIG. 9, are of two structures. One such rail 76, shown on the left hand side, is of stepped configuration and its base 76a is secured to the upper surface of the mower housing 14 by securing means. Another such rail 77 is mounted on a bushing 78 and is secured to the upper surface of the mower housing 14. Identical or mixed such constructions (one of each on different lateral edges) may be provided.

Figure 12:
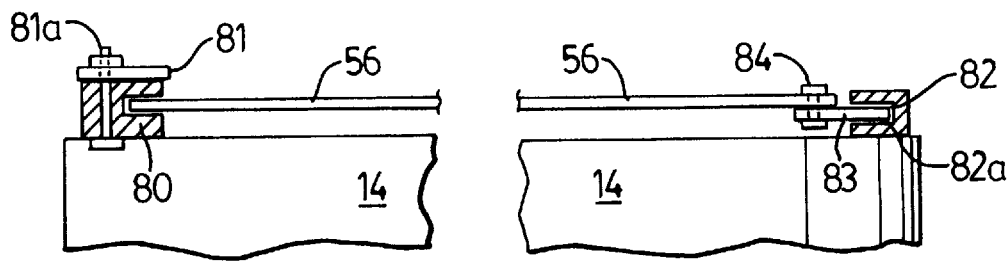
FIG. 12 is a side view of two further alternative embodiments of the mechanism for allowing relative movement between the mower housing and the upper plate connected thereto, in the embodiment shown in FIG. 6.

Yet two other such mechanisms are shown in FIG. 12. Here, the leading and trailing edges of the mower housing 14 are each fitted with transversely-extending rails which, as shown in FIG. 12, are of two structures. One such rail 80, shown on the left hand side, is of U-shaped, inwardly facing cross-section, and is secured to the upper surface of the mower housing 14 by a plate 81 and securing means 81a. The other rail 82 is of U-shaped, inwardly facing cross-section and its base 82a is secured to the upper surface of the mower housing 14 by securing means. Rails 80, 82 may be made of conventional low friction material, or may be made of metal and be lined with a conventional low friction material. The leading and trailing lateral edges of the plate 56 may each be slidably fitted within rails 80, 82 (in the manner shown on the left-hand side). Alternatively, the leading and trailing edges of plate 56 may be provided with a depending slip rail 83 which is secured to the plate 56 by securing means 84. The lateral edges of the slip rail 83 may be slidably fitted within rails 80, 82. Identical or mixed such constructions (one of each on different lateral edges), may be provided.

Figure 13:
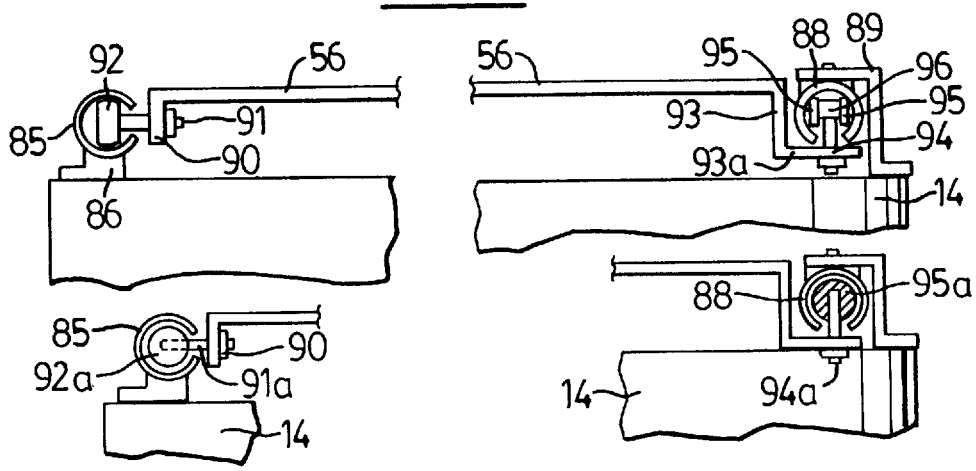
FIG. 13 is a side view of two additional alternative embodiments of the mechanism for allowing relative movement between the mower housing and the upper plate connected thereto, in the embodiment shown in FIG. 6.

Yet two other such mechanisms are shown in FIG. 13. The leading and trailing edges of the mower housing 14 are each fitted with transversely-extending guide tracks which, as shown in FIG. 13, are of two constructions. One construction shown on the left-hand side comprises a "C" rail 85, which is open inwardly, which is fixed by securing means, to a block rail 86, which in turn is secured to the upper surface of the mower housing 14. Another construction shown on the right-hand side is a "C" rail 88 which is open at the bottom, and is secured, as by securing means, to an "L" rail 89 itself secured, by securing means, to the upper surface of the mower housing 14 by securing means. Each of the lateral edges of the plate 56 is also provided with rollers adapted to roll within the "C" rails. On the left-hand side, the plate 56 is provided with a depending facia 90 which secures the axle 91 of a roller 92 which rolls within "C" rail 85. On the right-hand side, the plate is provided with a stepped ledge 93, the base 93a of which supports a yoke 94 on which two spaced-apart rollers 95 are mounted on an axle 96. Rollers 95 roll within "C" rail 88. While rollers 92 and 95 are shown in this embodiment, they may be replaced by gliders 92a on the left hand side and gliders 95a on the right hand side formed of conventional low friction material and mounted on their respective axles 91a and 94a. Identical or mixed constructions (one of each), may be provided.

Figure 14:
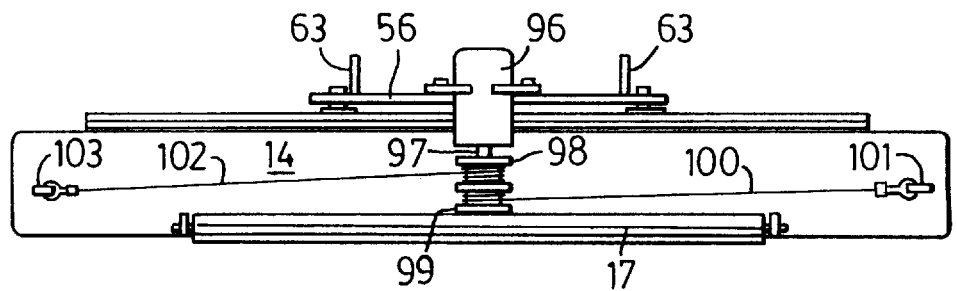
FIG. 14 is a rear elevational view of yet another embodiment of an operating mechanism for providing relative movement between the mower housing and the upper plate connected thereto, in the embodiment shown in FIG. 6.

Another means for moving mower housing 14 transversely is shown in FIG. 14. A suitable prime mover power source 96, e.g., a reversible motor, (whether it be gasoline, or diesel, or electrical, or hydraulic), is secured to the plate 56 and its drive shaft 97 depends downwardly. The drive shaft 97 is provided with two vertically spaced apart pulleys 98, 99. A cable 100 is fixed at anchor 101 at one lateral edge of the mower housing 14 and it entrains pulley 99. Another cable 102 is fixed at anchor 103 at the other lateral edge of the mower housing 14, and it entrains pulley 98.

Rotation of prime mover power source 96 in one direction pays out cable 100 and draws in cable 102, thereby moving mower housing 14 to the right. Opposite rotation of prime mover power source 96 pays out cable 102 and draws in cable 100, thereby moving mower housing 14 to the left.

Figure 15:
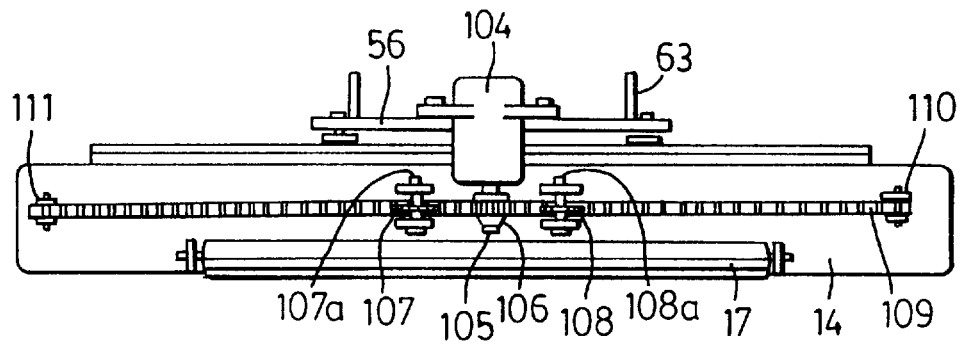
FIG. 15 is a rear elevational view of a still further embodiment of an operating mechanism for providing relative movement between the mower housing and the upper plate connected thereto, in the embodiment shown in FIG. 6.
Figure 16:
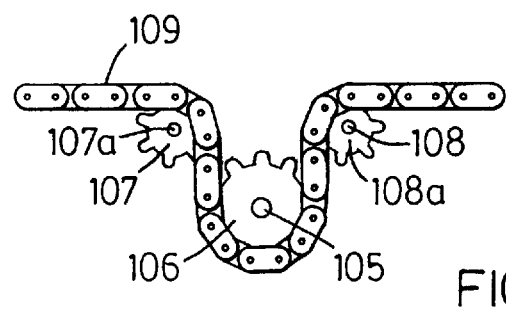
FIG. 16 is a top plan view of the sprocket, pinions and drive chain of the embodiment of FIG. 15.

Still another means for moving mower housing 14 transversely is shown in FIGS. 15 and 16. A suitable prime mover power source 104, e.g., a reversible motor, (whether it be gasoline, or diesel, or electrical or hydraulic), is secured to plate 56 with its drive shaft 105 depending downwardly and to which a drive sprocket 106 is fixed. A pair of laterally-disposed idler sprockets 107, 108 are freely rotatably mounted within the mower housing 14 on pins 107a, 108a (See FIG. 16). A chain 109 is trained around drive sprocket 106 and idler sprockets 107, 108, with one end thereof being secured at anchor 110 at one lateral edge of the mower housing 14, and with the other end thereof being secured at anchor 111 at the other lateral edge of the mower housing 14. Rotation of the power source 104 in one direction pulls the mower housing 14 in one transverse direction by means of the transverse movement of the chain 109, while rotation of the prime mover power source 104 in the other direction pulls the mower housing 14 in the other transverse direction by means of opposite transverse movement of chain 109.

Figure 17:
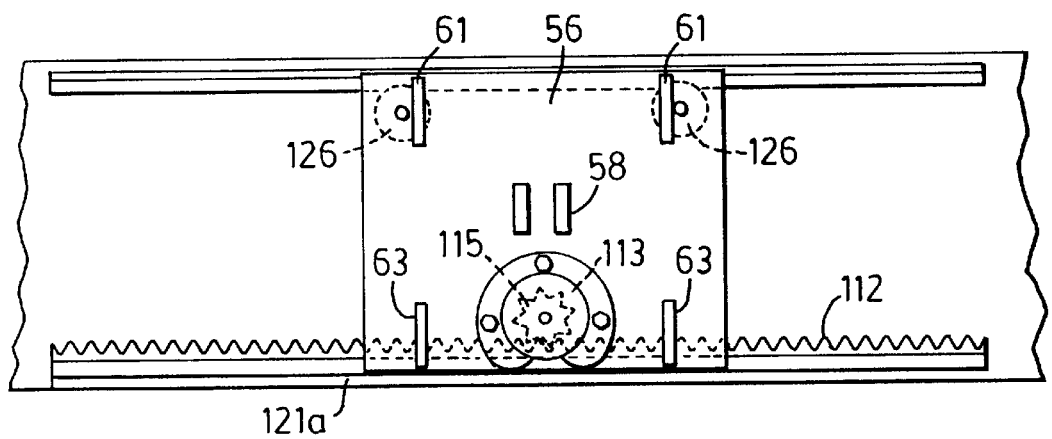
FIG. 17 is a top plan view of yet another embodiment of an operating mechanism for providing relative movement between the mower housing and the upper plate connected thereto, in the embodiment shown in FIG. 6.
Figure 18:
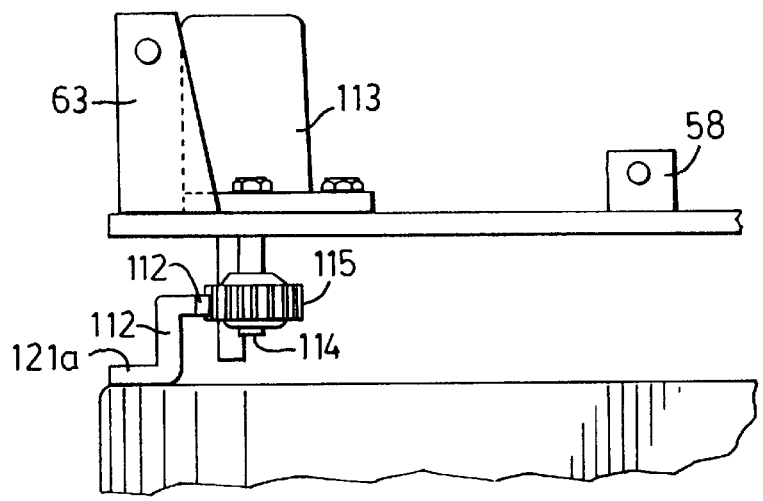
FIG. 18 is embodiments of the mechanism for allowing relative movement between the mower housing and the upper plate connected thereto, and a reversing motor in the operating mechanism shown in FIG. 17, of the embodiment shown in FIG. 6.
Figure 19:
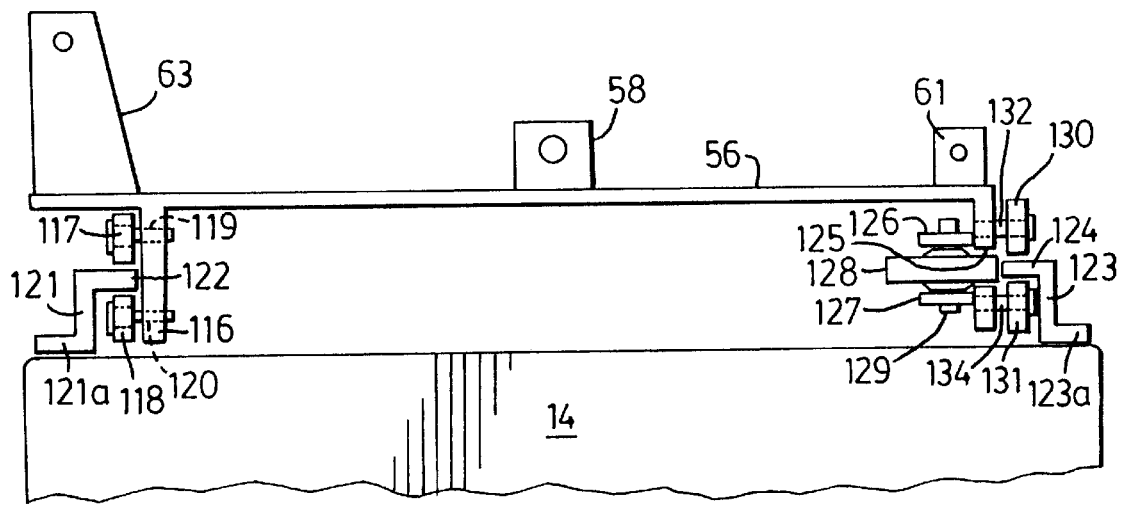
FIG. 19 is a cross-section of an embodiment with the motor removed for a clearer view, showing the mechanism for allowing relative movement between the mower housing and the upper plate connected thereto and a reversing motor, in the operating mechanism shown in FIG. 17, of the embodiment shown in FIG. 6.
Figure 20:
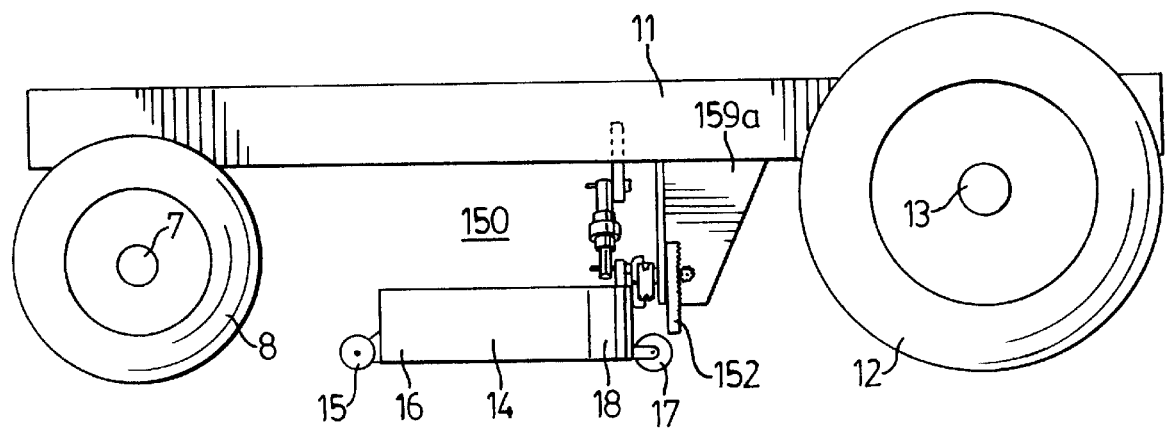
FIG. 20 is a side elevational view of another rear-mounted embodiment of the suspended mounting system of the present invention for the mower housing showing cooperation between a prime mover and a suitable linkage to provide vertical movement.

Yet another means for moving the mower housing 14 transversely is shown in FIGS. 17, 18, and 19. As seen in FIG. 17, one lateral edge of the mower housing 14 is provided with a lateral, transversely-extending gear rack 112. The plate 56 is provided with a prime mover power source 113, e.g., a reversible motor, (whether it be gasoline, or diesel, or electrical, or hydraulic), whose drive shaft 114 depends downwardly. A gear 115 is keyed to drive shaft 114 and it meshes with gear rack 112. The lateral edge of the plate 56 which is adjacent to the gear rack 112 is provided with a pendant skirt 116 to which two vertically spaced-apart rollers 117, 118, are freely rotatably mounted being freely rotatable on their respective axles 119, 120. A stepped guide rail 121 is secured, by securing means of its base 121a to the upper surface of lower plate 56. Its longitudinally-extending upper and lower bearing surfaces 122 rollingly support rollers 117, 118. On the other lateral edge of the mower housing 14 is a second stepped rail 123 secured by its base 123a, by securing means, to the top of the mower housing 14. The lateral edge of the plate 56 is provided with a depending skirt 125, which includes upper 126 and lower 127 rails. Between upper and lower rails 126, 127 is a horizontally disposed guide roller 128 which is freely rotatably mounted on its vertical axle 129 which extends between rails 126, 127. The upper 126 and lower 127 rails include respective rollers 130, 131, which are freely rotatably mounted on their respective horizontal axles 132, 133. Rollers 130, 131 are rollingly supported on upper and lower bearing surfaces 124 of rail 123. Rotation of the prime mover power source 113 in one direction moves the gear rack in one direction to result in transverse movement of the mower housing 14 in one direction. Opposite rotation of the prime mover power source 113 causes the mower housing 14 to move transversely in the opposite direction.

(iii) Description of FIGS. 20–26

Referring to FIGS. 20–23, the mower attachment 14 is mounted on a conventional vehicle having a longitudinal body including longitudinally-extending rails 11, front steering wheels 8 and front axle 7, rear driving wheels 12 and axle 13 and a sufficient bed area between the front axle 7 and the rear axle 13 to accommodate the mower housing and the suspended mechanism 150. A conventional design mowing attachment including a housing 14 is attached to the above-defined bed area in the manner to be described hereinafter, the mowing attachment and housing 14 having a front lower wheel 15 mounted on lower forward housing area 16 and a rear lower roller 17 mounted on a lower rear housing area 18 to allow the mower housing 14 to ride over turf in order to prevent scalping.

The suspended mounting system 150 includes a pair of brackets 159, each being secured to an associated chassis rail 11 by means of securing means. Each bracket 159 is defined by a pair of spaced-apart vertical plates 159a (See FIG. 19). Drive gears 153 are keyed on transverse shaft 154 between plates 159a, gears 153 meshing with a vertical gear racks 152. Vertical gear racks 152 are provided with an axle 162, spacer sleeve 151 and washer plates 166b to which pulley 189 is freely-rotatably-mounted. Axle 162 is vertically slidable in vertical slots 161 in vertical plates 159. Transverse shaft 154 is supported on its near outer ends by bearing or bushing 174.

Figure 22:
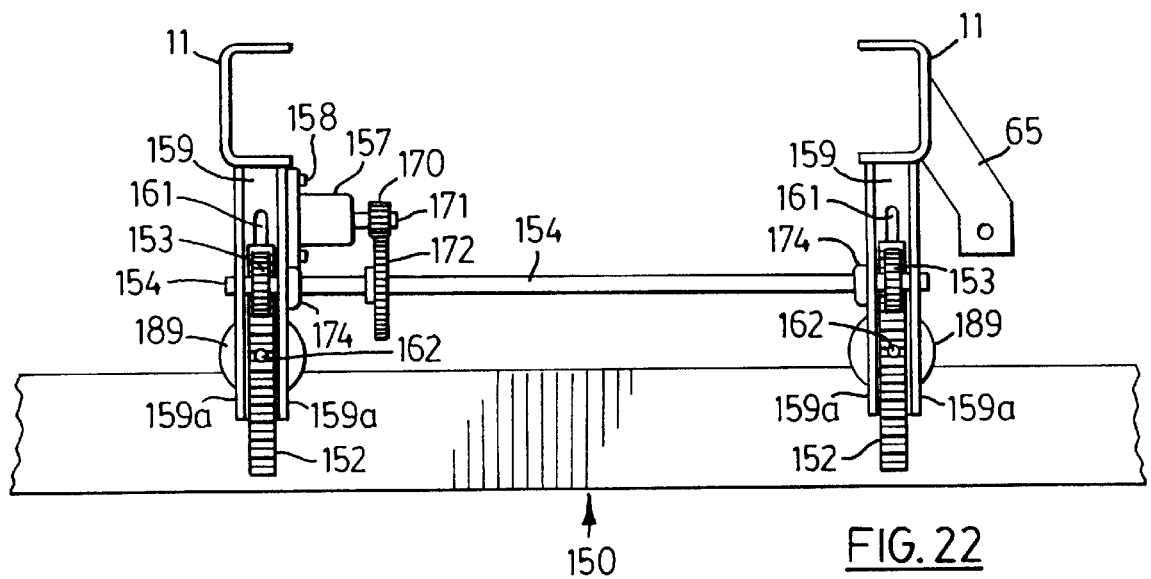
FIG. 22 is an elevational end view showing another view of the operating mechanism shown in FIG. 21 to provide vertical movement for the embodiment shown in FIG. 20.

As seen in FIG. 22, a common prime mover power source 157 is secured to one side plate 159a at securing means 158. This prime mover power source 157 includes a drive shaft 171 to which a drive gear 170 is keyed. Drive gears 170 drive common-driven gears 172 which are keyed to a cross-shaft 154. As previously described, transverse shaft 154 has drive gears 153 splined to each end thereof, for engagement with its respective gear racks 152.

Figure 21:
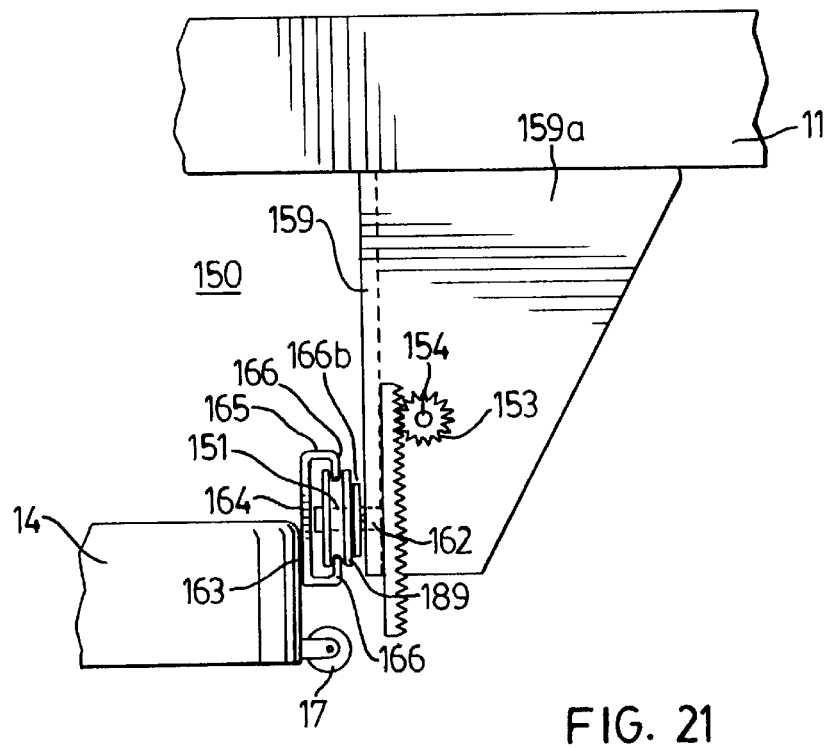
FIG. 21 is an enlarged view showing the operating mechanism to provide vertical movement, of the embodiment shown in FIG. 20.

An essentially frictionless guide system (to be described later with FIGS. 24 to 26) is provided for the relative essentially-frictionless transverse movement of the mower housing 14 with respect to the chassis rails 11. The transverse movement is facilitated by slide rail 163 provided along the trailing edge of the mower housing 14. As shown in FIG. 21, it includes a rear plate 164, upper and lower extensions 165 and upper and lower flanges 166 to provide a channel 166a therebetween.

Figure 23:
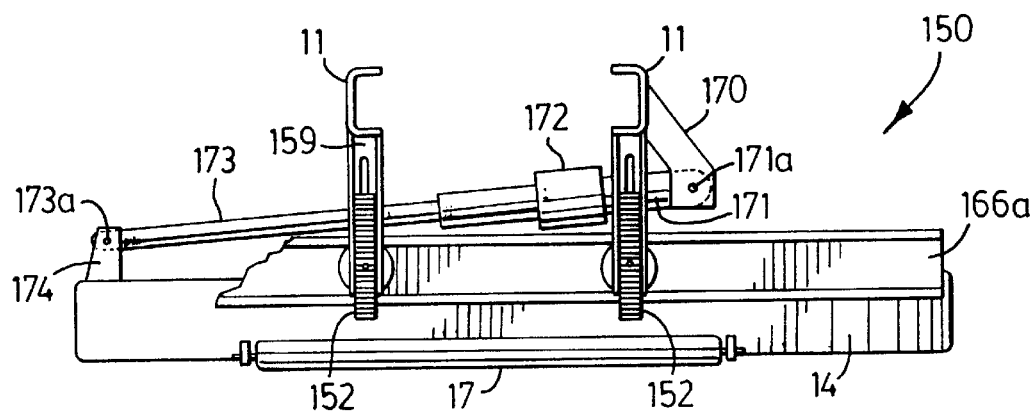
FIG. 23 is a rear elevational view of the suspended mounting system of the present invention shown in FIG. 20 for the mower housing, showing the cooperation between a prime mover and a suitable linkage to provide lateral movement.

As seen in FIG. 23, the suspended system 150 also includes a downwardly, outwardly, diagonally-directed bracket 170 which is firmly secured to one rail 11. The cylinder end 171 of a hydraulic cylinder 172 is pivotally-secured to the lower end of bracket 170 by pin 171a. The rod end 173 of cylinder 172 is secured by pin 173a to ear 174 which is upstanding from one lateral edge of mower housing 14.

Figure 24:
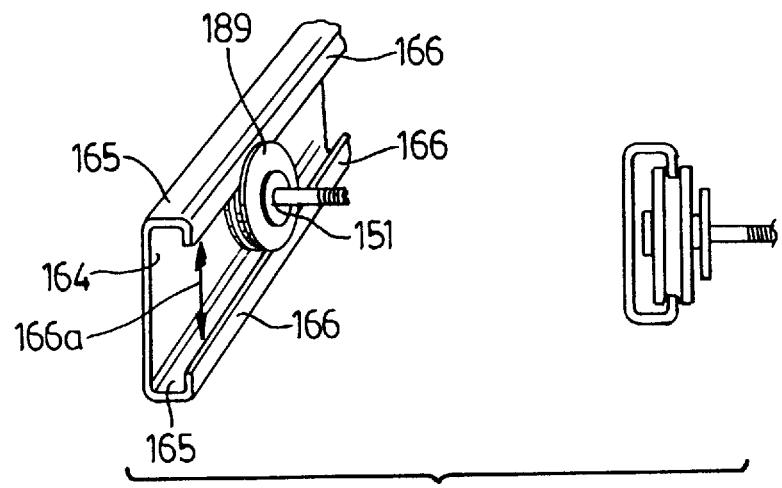
FIG. 24 is an enlarged view of one variant of an essentially-frictionless guide system for the relative transverse movement of the mower housing.
Figure 25:
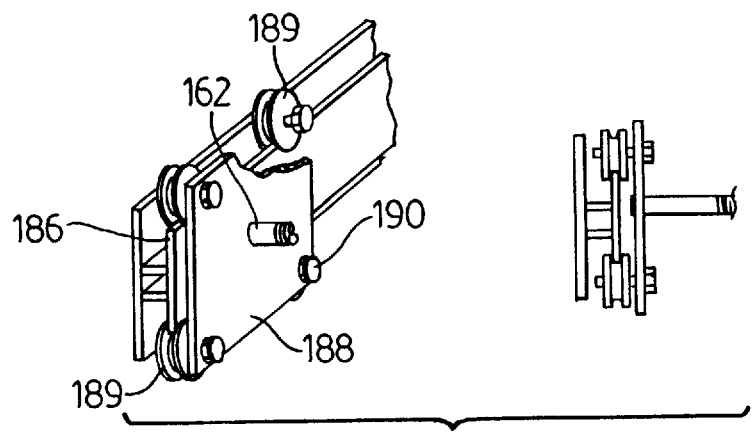
FIG. 25 is an enlarged view of another variant of an essentially frictionless guide system for the relative transverse movement of the mower housing.
Figure 26:
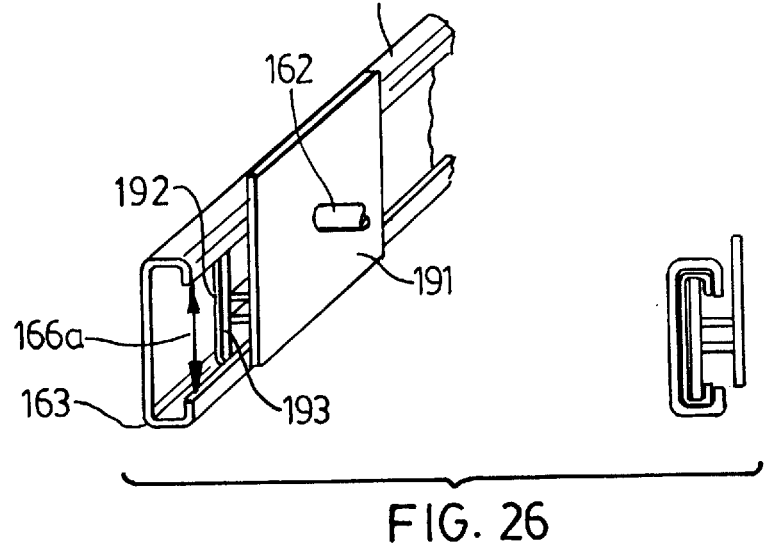
FIG. 26 is an enlarged view of yet another variant of an essentially frictionless guide system for the relative transverse movement of the mower housing.

FIGS. 24 to 26 show alternative means to provide essentially-frictionless traverse guiding of the mower housing 14.

As seen in FIG. 24, the guiding system consists of a pulley 189 which is adapted to roll on top of lower channel flange 166, and which is guided by upper channel flange 166. Pulley 189 is freely-rotatably-mounted on a bushing-spacer 151, with pin-bolt 162 inserted through pulley 189. Bushing-spacer 151, spacer-washer 166b, and gear rack 152, all adapted to slide vertically freely in slot 161.

As seen in FIG. 25, the rail system includes an "H" -shaped guide rail 186 which is secured to the mower housing 14. A short rectangular plate 188, to which pin bolt 162 is fixedly-secured is provided with four Vee-pulleys 189, each being rotatably mounted on its respective axle pin 190, i.e., one at each of the corners of the plate 188. As described with reference to FIG. 24, pin 162 is adapted to slide vertically, freely within slot 161.

As seen in FIG. 26, the guide rail 163 is secured to the mower housing 14 by securing means. An outer guide plate 191 is provided to which pin bolt 162 is fixedly secured. Guide plate 191 supports frictionless slider 192, formed e.g., of TEFLON™ by means of bar 193. Slider 192 is adapted to slide freely transversely in channel 166a in guide rail 163. Pin bolt 162 is adapted to slide freely vertically in slot 161.

Vertical movement of mower housing 14 is provided as follows:

Actuation of the prime mover power source 157 causes the transverse shaft 154 to rotate, which in turn causes gear 153, engaged with the gear rack 152, to rotate. Rotation of sprocket 153 in a clockwise direction causes the gear rack 152, and hence the mower housing 14 to be raised. Conversely, counterclockwise rotation of the sprocket 153 causes the gear rack 152, and hence the mower housing 14 to be lowered.

To move the mower housing 14 transversely, hydraulic cylinder 172 is actuated to extend rod end 173. This cause track 163 to move to the left within the constraints of the guide systems, i.e., the roller wheels shown in FIG. 24, the rolling plate show in FIG. 25 or the slider plate shown in FIG. 26. Actuation of the cylinder 172 to retract rod end 173 causes the mower housing 14 to move to the right, again within the constraints of the guide systems.

Figure 27:
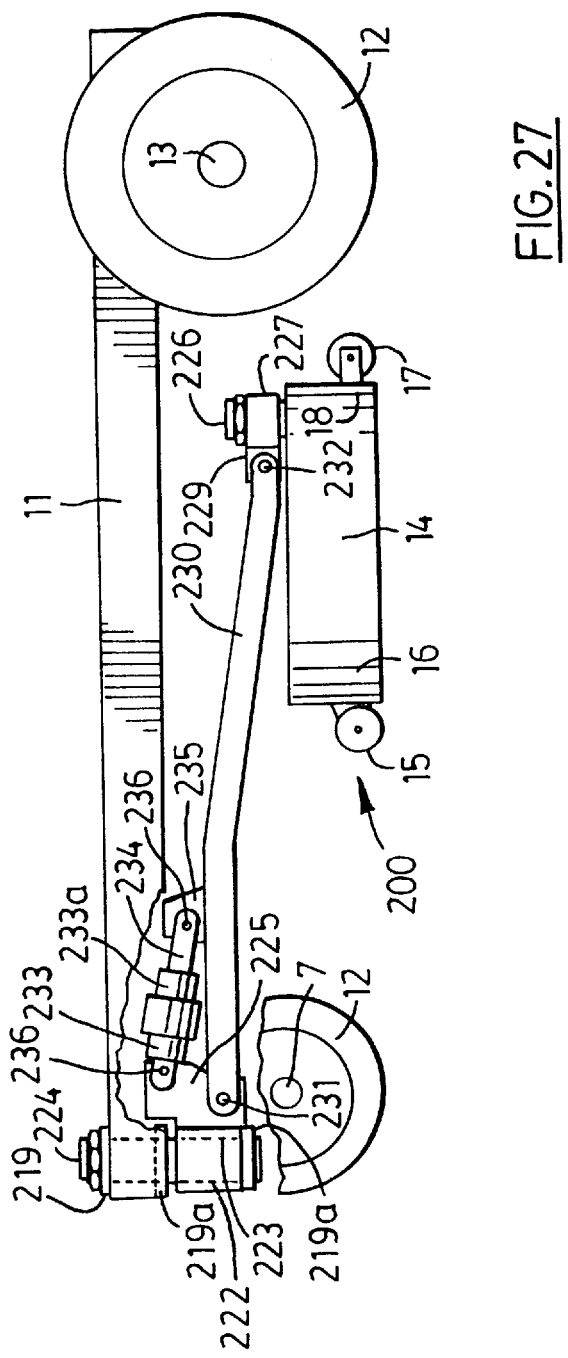
FIG. 27 is a side elevational view of yet another embodiment of the suspended system of the present invention for the mower housing.
Figure 28:
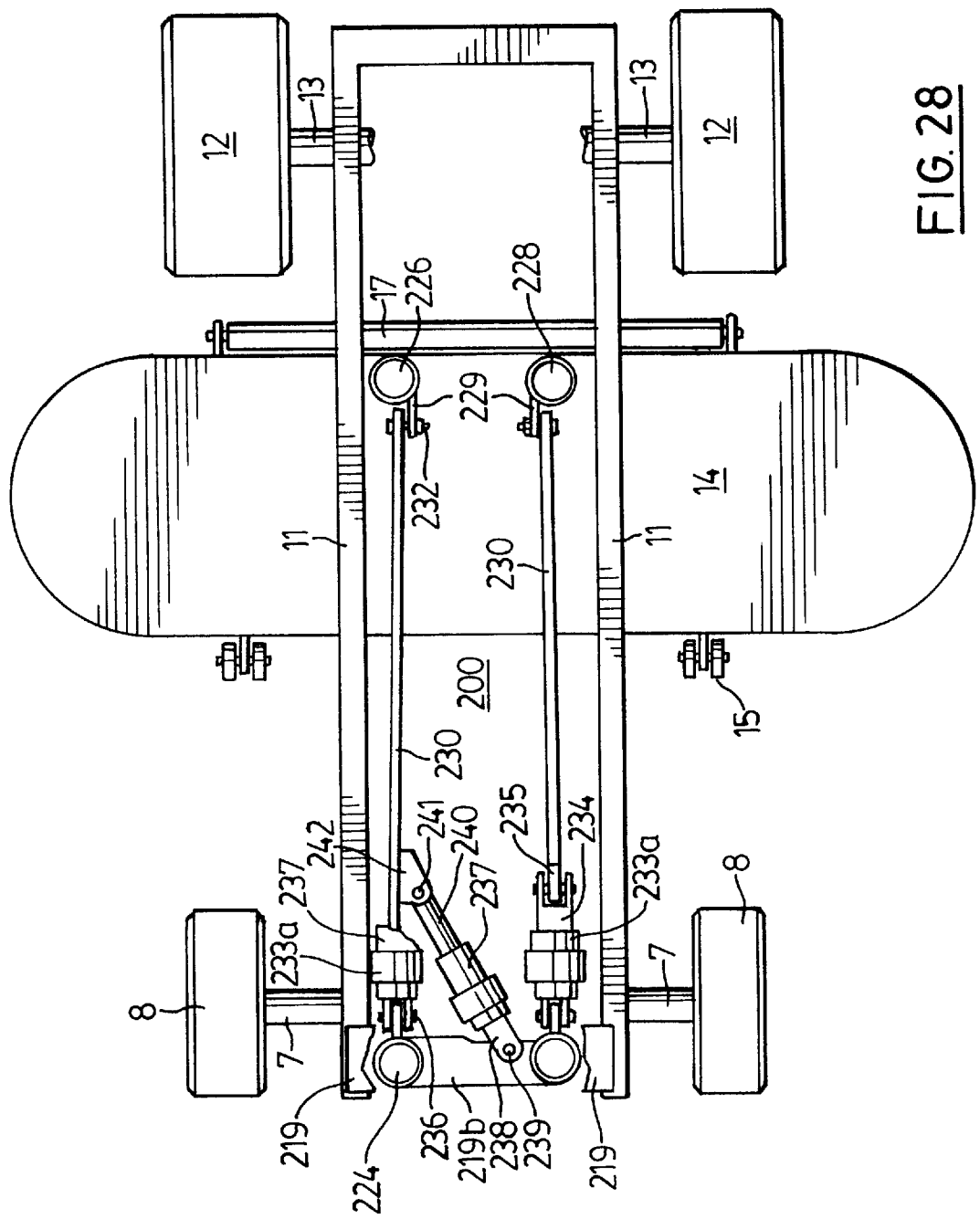
FIG. 28 is a top plan view of the embodiment of suspended system shown in FIG. 27.
Figure 29:
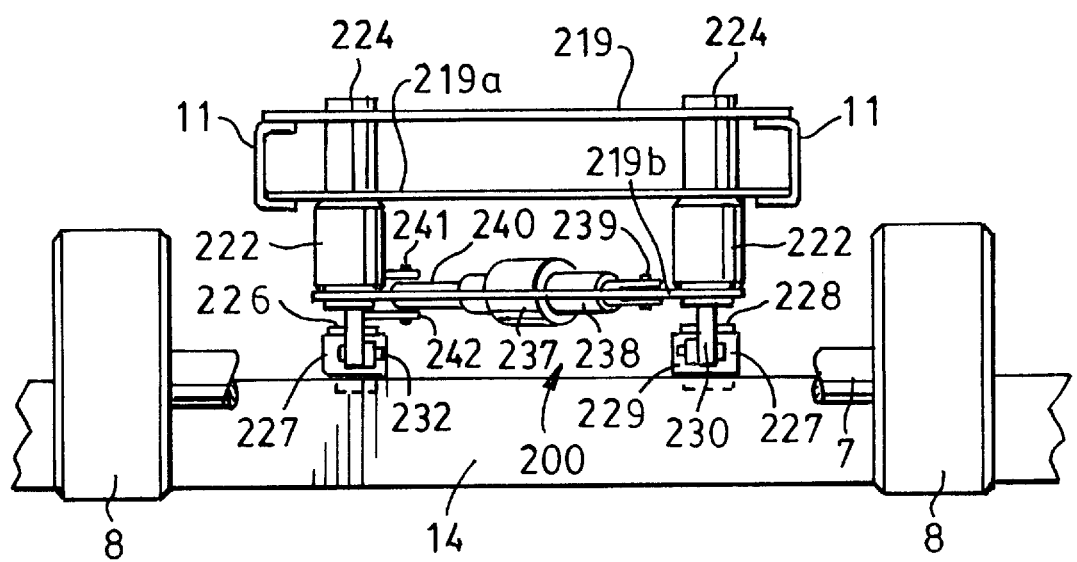
FIG. 29 is an enlarged front elevational view of the suspended system shown in FIG. 27.

(iv) Description of FIGS. 27 to 29

Referring to FIGS. 27, 28, and 29 the mower attachment 14 is mounted on a conventional vehicle having a longitudinal body including longitudinally-extending rails 11 front steering wheels 8 and front axle 7, rear driving wheels 12 and rear axle 13 and a sufficient bed area between the front axle 7 and the rear axle 13, to accommodate mower housing and suspended mechanism 200. A conventional design mowing attachment including a housing 14 is attached to the above-described bed area in the manner to be described hereinafter, the mowing attachment and housing 14 having front lower wheels 15 mounted on lower forward housing area 16 and a rear lower roller 17 mounted on a lower rear housing area 18 to allow the mower housing 14 to ride over turf in order to prevent scalping.

The mower housing 14 is suspended from the longitudinal chassis 11 of the vehicle by a suspended mounting system 200. Two cross-bars 219 and 219a are mounted between two longitudinally-extending chassis rails 11. Depending from main support posts 224. Support posts 224 support a pair of slewably-rotatably brackets 222, each of which has a hollow cylindrical portion 223 which is concentrically disposed around its respective upright post 224. Each bracket 222 includes an ear 225 projecting therefrom.

The mower housing 14 includes two rearward, transversely spaced-apart posts 226 at the rear edge and medial region of the mower housing 14. Each post 226 is provided with a bracket 227, concentrically disposed therearound a central, vertical, hollow cylindrical post 226. Each bracket 227 includes a projecting ear 229.

The lower portion of ear 225 pivotally supports an associated one of a pair of laterally spaced-apart, longitudinally-extending control arms 230 by pins 231. The other end of each of the control arms 230 is pivotally attached to its associated ear 229 by means of pins 232. The upper portion of ear 225 pivotally supports the cylinder ends 233 of each of a first pair of cylinders 233a at pins 236. The rod ends 234 of each of the first pair of cylinders 233a are pivotally-secured to upstanding ears 235 on the two control arms 230 by means of pins 236. A second cylinder 237 is pivotally-secured by its fixed end 238 of the cross-bar 219b by means of pin 239 (see FIG. 29). The rod end 240 is pivotally-secured at pin 241 to an ear 242 on one of the control arms 230. Thus, cylinder 237 is diagonally disposed with its fixed end adjacent one control arm 230 and with its rod end 240 adjacent the other control arm 230.

In operation, to provide vertical up-and-down motion, cylinders 233a are actuated to retract rod ends 234. This serves to raise central arms 230, which causes mower housing 14 to be elevated. Actuation of the cylinders 233a to extend rod ends 234 causes mower housing 14 to be lowered. The slight arc motion with horizontal movement could be kept at a minimum.

To provide transverse movement, cylinder 237 is actuated to extend rod end 240. This causes mower housing to steer (slightly) to the right. Reverse actuation to retract rod end 240 causes the mower housing 14 to steer to the left. No levelling device would be required in this arrangement.

Figure 30:
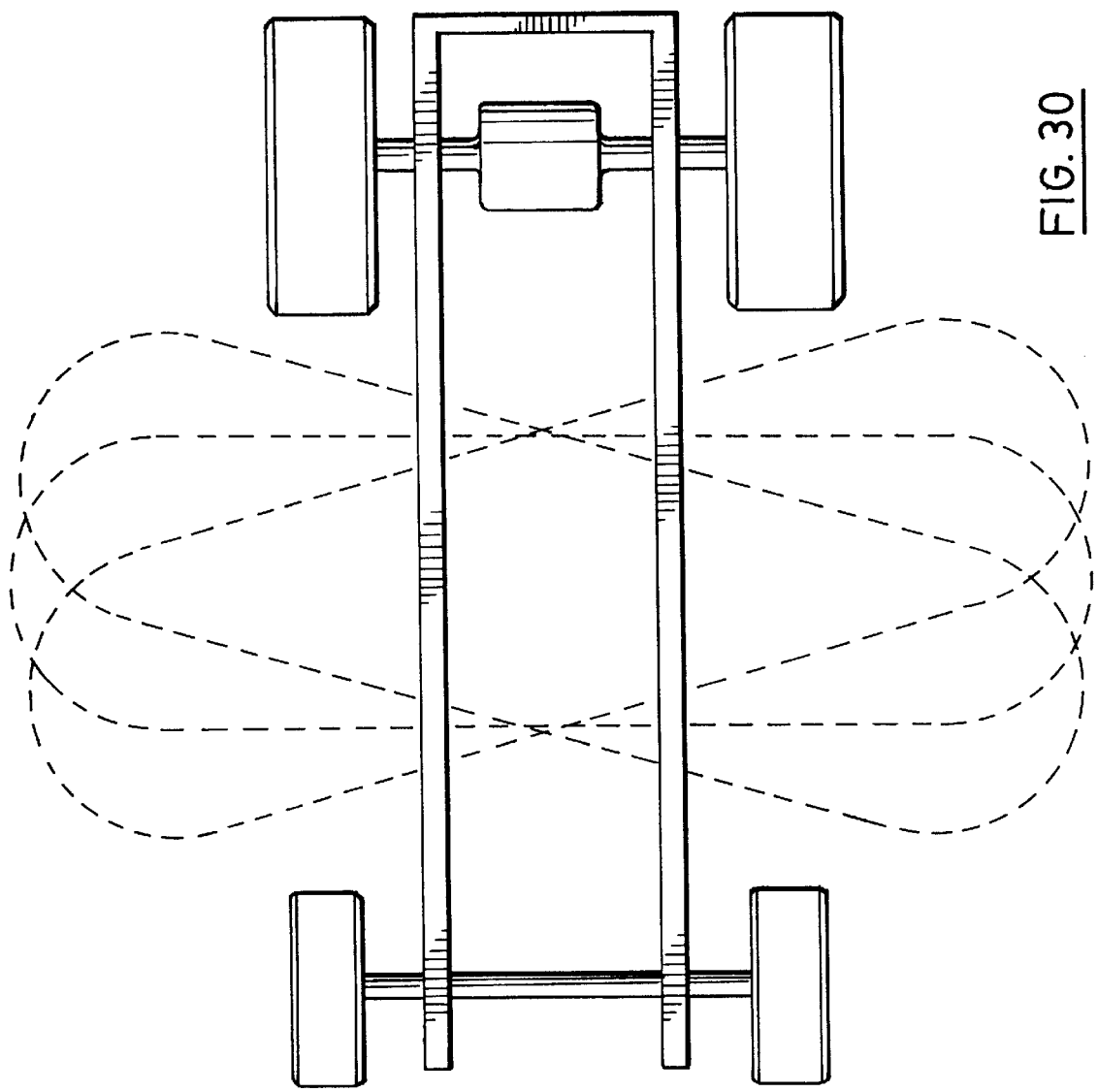
FIG. 30 is a schematic top plan view of the mower housing of the present invention showing its orientation with respect to the longitudinal rails.

(v) Description of FIG. 30

FIG. 30 is a top view of a vehicle with a mower housing 14, mounted below the vehicle between the front axle 7 and rear axle 13. This mower is mounted so that the mower housing is fixed at a 70° to 90° angle to the frame rails of the supporting vehicle. The forward leading edge can be to the left or right of the vehicle.

This unique mower mounting can easily be achieved by using any one of the linkages and prime movers disclosed hereinbefore with respect to FIGS. 1, 5, 6, 20, and 27. By simply repositioning the guide arms 27 (FIGS. 1, 5), the descending brackets 59 (FIG. 6), the descending brackets 159 (FIG. 20), and the descending shaft 224 (FIG. 27), such mounting can be readily achieved by a person skilled in the art.

Some of the features of the mower mounting angle, as it relates to the vehicle as shown in FIG. 29 are: it allows the operator to use a wider and narrower cutting mower and still give the operator greater manoeuvrability when passing between narrow objections, parking the machine in a building, manoeuvring around other parked vehicles, etc.

(vi) Description of FIGS. 31 to 37

Figure 31:
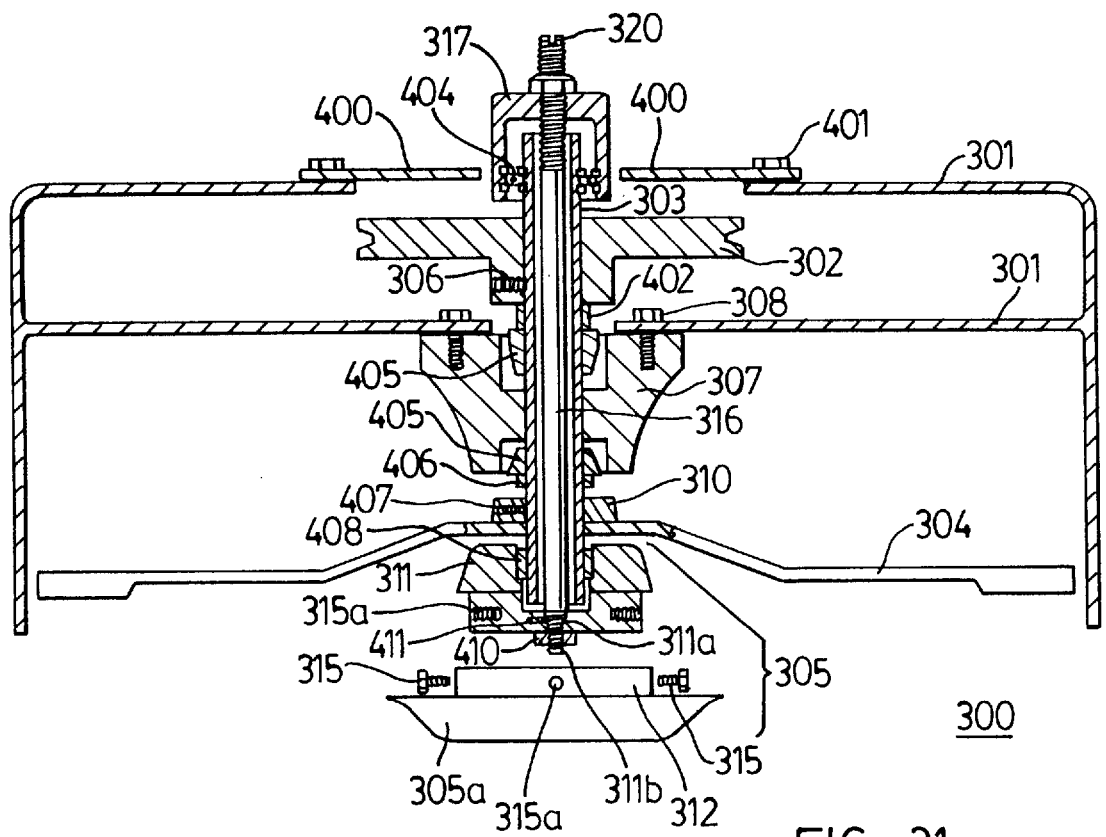
FIG. 31 is a central longitudinal cross-sectional view of a multi-bladed power mower assembly including one of several novel ground-engaging shoes shown unattached to, but closely positioned below, the main body for better viewing of the assembly of this invention.

As seen in FIGS. 30 and 31, a multi-bladed power mower assembly 300 is provided. The assembly includes a common housing 301 supporting a plurality of drive belt pulleys 302. These pulleys 302 are driven in common by a V-belt (not seen). A known, heavy duty, supporting hub assembly 307 is provided with two tapered roller bearings 405. The drive pulleys 302 each drive a hollow shaft 303 which causes a mower blade 304 to rotate. Hollow shaft 303 also supports a two-part, load-bearing, self-aligned body assembly 305 which can accommodate several alternative ground engaging shoe assemblies, to be further described in FIG. 32 to 37.

The pulley 302 is keyed to a hollow drive shaft 303 by means of set screws 306. The hub 310 of the mower blade 304 is keyed to, and rotates with, shaft 303.

The ground engaging shoe assembly 305 includes a bearing housing 311 which includes a well into which a roller bearing or bushing 408 is secured. The lower base of the hollow shaft 303 rotates within bearing or bushing 408 to enable the bearing housing 311, to remain stationary while the hollow shaft 303 rotates. The ground-engaging shoes 305a, 305b, 305c are commonly affixed to the bearing housing 311 by a circular collar 312, and four attaching bolts 315.

As seen more clearly in FIG. 31, an adjusting bolt 316 is secured to the ground engaging shoe housing 311 as follows: The lower portion of adjusting bolt 316 has a tapered shank 311a followed by a threaded end 311b, which is received by housing 311, which has a threaded hole with a tapered entry. A locking nut 410 and set screw 411 further secures adjusting bolt 316 to housing 311. Adjusting bolt 316 extends upwardly within hollow shaft 303. The upper end of hollow shaft 303 is fitted with a tower housing 317, provided with threaded upper hole 318. The adjusting bolt 316 is provided with threads 319 operating within tower housing 317.

Tower housing 317 is fixed to hollow shaft 303 by four snap rings 409. The slotted head 320 of the adjusting bolt 316 with locking nut is operative to rotate the bolt 316 relative to the hollow shaft 303, in order to move the ground engaging shoe assembly 305 vertically. Thus the vertical weight of the mower housing 14, is transferred through the ground engaging shoe assembly 305 to the upper tower housing 317 by means of adjusting bolt 316, and subsequently to the load bearing assembly 404.

Figure 32:
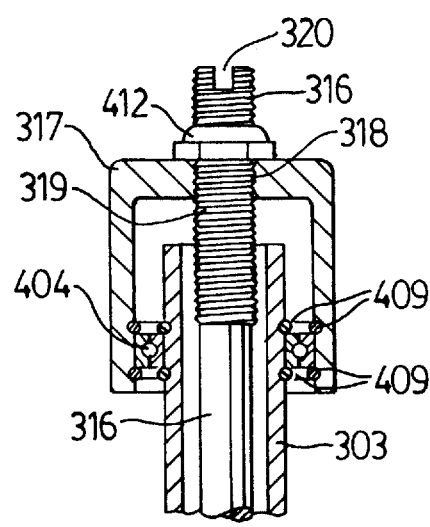
FIG. 32 is an enlarged central longitudinal cross-sectional view of the upper portions of the vertical central system for the ground engaging shoe assembly of this invention.
Figure 33:
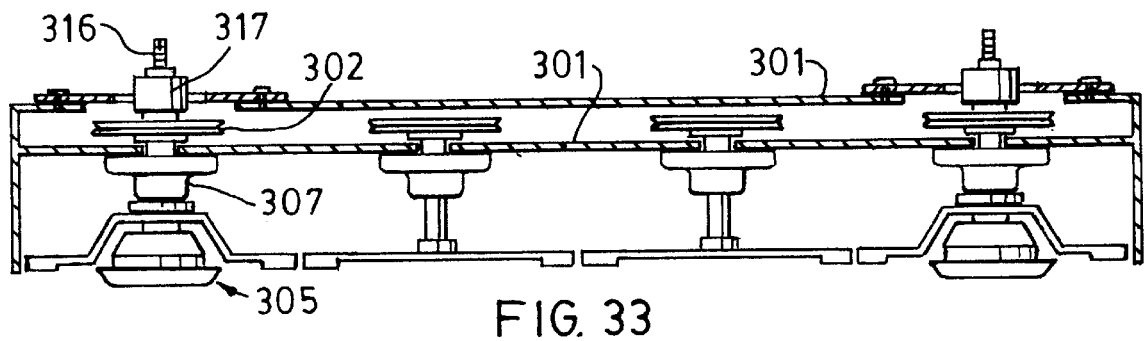
FIG. 33 is a central transverse section through a multi-bladed power mower including a plurality of adjacent power mowers and a plurality of ground engaging shoes.

FIGS. 32 and 33 show in detail a ground engaging shoe which is part of the ground engaging shoe assembly 305a shown in FIG. 30. Thus, the ground engaging shoe 314 is shown as well as attaching collar 312, which has four holes for the attaching bolts.

Figure 34:
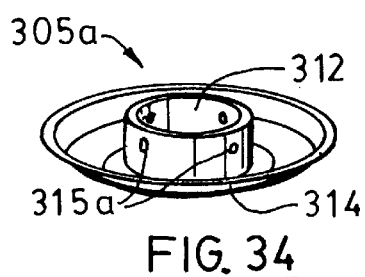
FIG. 34 is a perspective view of one lower embodiment of a ground engaging shoe.
Figure 35:
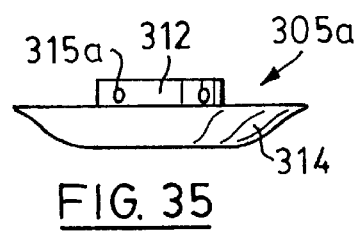
FIG. 35 is a side elevational view of the lower embodiment of ski pad shown in FIG. 34.

The assembly of FIG. 34 is constructed of light-weight material and is shown as a dished-type ground engaging shoe, that acts like a rolling, horizontal wheel, thus substantially reducing drag to the mower housing as it travels over the turf. In addition, this novel ground engaging shoe 305a has an outer perimeter 314 that is turned slightly upward, thus causing the engaging shoe to follow the mower 14, in any direction, and also causing it to ride over any irregularities on the turf, and leaving very little ground depression. The novel ground-engaging shoe assembly, when used, also eliminates any crushing of grass which may be caused by any outer housing wheels, rollers, or skid pads just prior to being cut by outer blades, when travelling in any direction.

Figure 36:
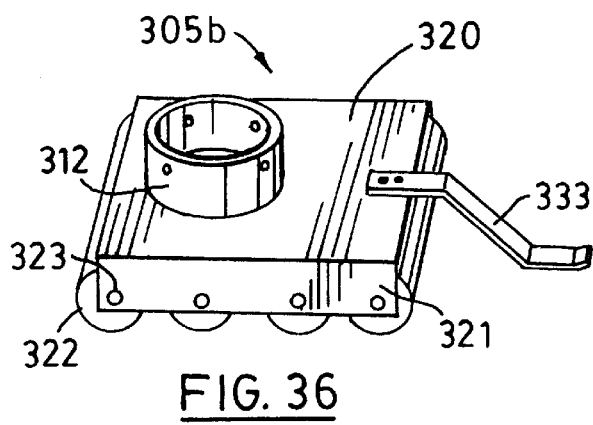
FIG. 36 is a perspective view of another embodiment of a ground engaging shoe.
Figure 37:
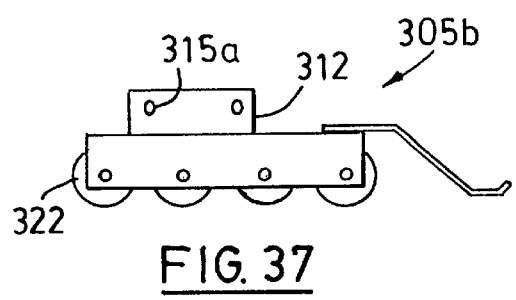
FIG. 37 is a side elevational view of the embodiment of ground engaging shoe shown in FIG. 36.

FIGS. 36 and 37 show a further embodiment of the ground engaging shoe 305b. This shows a rectangular plate 320, which is provided with two parallel depending skirt 321. Each skirt 321 supports a plurality (e.g., four) freely rotatable wheels 322, which are rotatable on axles 323. A mounting collar 312 is securely fixed to the upper surface of rectangular plate 320. The assembly 305b of FIG. 36, which is also constructed of a light-weight material and has an off-set mounting collar 312 location which causes this ground engaging shoe assembly 305b to follow the mower housing similar to any caster wheel. A spring tab 333 on the trailing edge of plate 320 causes the ground-engaging shoe assembly 305b to follow the mower housing in all positions. This novel design allows for a number of roller wheels or cylinders, thus reducing drag and ground depression to a minimum. A spring-type tab 333 mounted to the trailing section causes the shoe assembly to follow the mower housing even when shoe assembly is not touching the ground.

Figure 38:
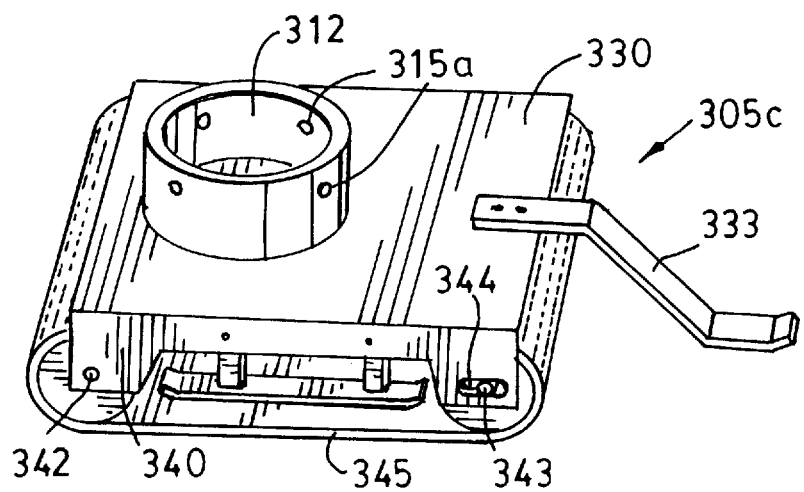
FIG. 38 is a perspective view of yet another embodiment of a ground engaging shoe.
Figure 39:
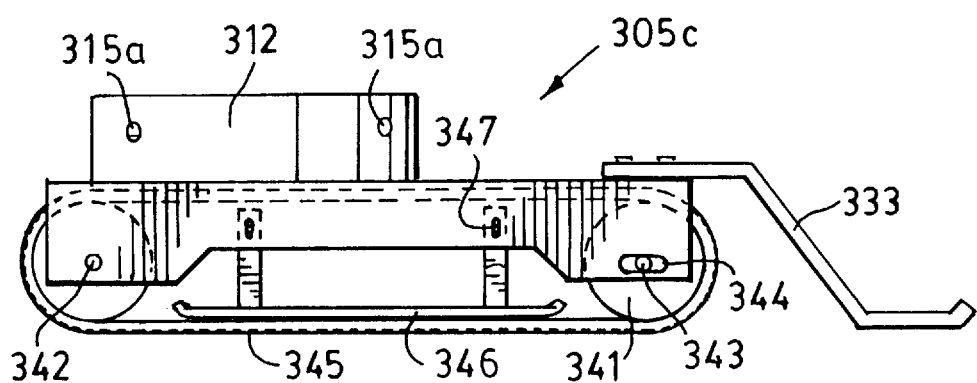
FIG. 39 is a side elevational view of the embodiment of ground engaging shoe shown in FIG. 38.

FIGS. 38 and 39 show a further embodiment 305c of ground engaging shoe assembly 305. This ground engaging shoe assembly 305c includes a rectangular support plate 330. Depending from plate 330 are two parallel skirts 340. Each skirt 340 supports two roller drums 341, which are rotatable on axles 342, and 343 respectively. Each skirt 340 contains a slotted opening 344 to allow adjustability of axle 343, which then allows belting 345 to be tightened. A mounting collar 312 securely fastens to plate 330. Each depending skirt 340 supports, by attaching bolts 347, an adjustable low friction slide runner 346 further to support belt 345. A spring tab 333, on the trailing section of 330, causes the shoe assembly to follow the mower housing in all positions.

The assembly of FIG. 38 is also constructed of a light-weight material, and also has an offset mounting location to allow good castering effect. The highly flexible low friction belt pad material and a low friction drum rollers, allow for a ground-engaging shoe assembly that has a large square inch area of ground contact, thus allowing for an even larger weight bearing mower housing assembly and less ground depression.

This unique ground engaging shoe assembly when used on the outer cutting blades of a multi-bladed power mower, or on any commonly-produced mower after slight modifications, will replace the caster wheel, roller wheels, or skid plates mounted near the outer perimeter of the outside ends of a mower housing, thus preventing grass scalping. The current skid plates, caster wheels, or roller wheels, presently mounted around the perimeter of the outer ends of the mower housing, prevent many mowers from trimming closely around obstacles. This situation is more critical with this series of mowers of embodiments of the present invention, which have a laterally-movable mower housing.

With this device mounted on the outer end of the cutting blade one can now remove any skid plates, caster wheels, roller wheels, etc. from around the outer perimeter of the outer ends of a mower housing. This new two-part load-bearing assembly houses a heavy duty bearing or bushing, which allows the outer body to slowly rotate in either direction. In detail, the hollow drive shaft houses a long (threaded at two ends) adjusting bolt with a locking nut. Turning this adjusting bolt will, in turn, push the ground engaging shoe assembly up or down to accommodate different grass cutting heights. This assembly will accommodate at least three different types of ground engaging shoes, as shown. In addition, this embodiment of the invention makes cutting height of the mower housing effectively easy and quick to adjust from the top side of the mower.

6) CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. The combination of a motor-driven vehicle having front wheels and rear wheels and a longitudinally-extending frame bed therebetween, a transversely-mounted powered grass-cutting mower, the mower having a housing and powered grass cutting blades, and a suspended mounting system for mounting the mower to the frame bed, said suspended mounting system comprising:

(i) vertical guidance means which are a component of said suspended mounting system, said vertical guidance means being secured between said longitudinally-extending frame bed of said motor-driven vehicle and said mower housing;

(ii) rigid linkage means secured between said longitudinally-extending frame bed of said motor driven vehicle and said mower housing;

(iii) a first powered operating means which is connected to said rigid linkage means for moving said mower housing in a finite number of controlled, vertically-upwardly guided positions to a maximum upper position within the constraints of said vertical guidance means, and for moving said mower housing through a finite number of controlled, vertically-downwardly guided positions to a minimum lower position within the constraints of said vertical guidance means, said vertical locations thereby being between an upper limit and a lower limit;

(iv) horizontal guidance means secured to said mower housing for guiding lateral movement of said mower housing relative to said longitudinally-extending frame, said lateral movement being between a left lateral limit and a right lateral limit; and (vi) a second powered operating means, which is operatively associated with said horizontal guidance means, for moving said mower housing, within the constraints of said horizontal guidance means, through a finite number of positively-controlled lateral locations between said left lateral limit and said right lateral limit.

2. The combination of claim 1 wherein the mower housing is secured at an angle of from about 70°–90° relative to the frame bed.

3. The combination of a motor-driven vehicle having front wheels and rear wheels and a longitudinally-extending frame bed therebetween, a transversely-mounted powered grass-cutting mower, the mower having a housing and powered grass cutting blades, and a suspended mounting system for mounting the mower to the frame bed, as claimed in claim 1, wherein said suspended mounting system is further characterized in that:

(i) said vertical guidance means also includes a pair of longitudinally-spaced-apart, vertically-depending guide arms which depend from an associated said transversely-spaced-apart longitudinally-extending rail which constitute said longitudinally-extending frame bed of said motor-driven vehicle, and a supporting bracket which is spaced longitudinally from said guide arms;

(ii) said first powered operating means comprises a first push-pull mechanism including a reciprocally-movable rod, an end of said first push-pull mechanism being fixed relative to said reciprocally-movable rod, said fixed end thereof being pivotally-secured to said suspending bracket for arcuate, vertical rotation, the rod end of said first push-pull mechanism being pivotally-secured to a first operating mechanism which, in turn, is secured to said mower housing for moving said mower housing, within the constraints provided by said guide arms, through a finite number of vertical locations between an upper limit and a lower limit; and (iii) said second powered operating means comprises a second push-pull mechanism including a reciprocally-movable rod, an end of said second push-pull mechanism being fixed relative to said reciprocally-movable rod, said fixed end of said second push-pull mechanism being pivotally-secured to said bracket for vertical movement relative thereto, said rod end of said second push-pull mechanism being pivotally-secured to a second operating mechanism which, in turn, is pivotally-secured to said mower housing for moving said mower housing, the constraints provided by said guide arms, through a finite number of lateral locations between said left lateral limit and a right lateral limit.

4. The combination of claim 3 wherein said rod end of said first push-pull mechanism is pivotally-connected to an ear of a central arm which, in turn, is pivotally-secured to said mower housing.

5. The combination of claim 4, wherein said pivotal securement of said central arm to said mower housing comprises a shackle which is secured in a vertical orientation to the transversely-extending edge of said mower housing, and an ear extending from said central arm, with a vertically-extending bolt passing through aligned apertures in said shackle and said ear.

6. The combination of claim 4, wherein said central arm comprises a two-part telescopic outer arm and inner arm, said inner arm and said outer arm being interconnected non-rotationally to one another and being adapted to allow the lateral movement, compared to an arcuate movement, of said mower housing to adopt a true lateral movement, compared to an arcuate movement, within the constraints provided by said guide arms.

7. The combination of claim 6, and including an adjustable link between said shackle and said ear on said outer arm of said two-part telescopic outer arm and inner arm.

8. The combination of claim 6 wherein a rod end of said first push-pull mechanism is pivotally-connected to an ear of said outer arm of said two-part telescopic outer arm and inner arm, said outer arm being pivotally-secured to said mower housing.

9. The combination of claim 3, wherein said adjustable link is a turnbuckle.

10. The combination of claim 3, wherein said adjustable link is a third push-pull mechanism including a reciprocally-movable rod and having an end which is fixed relative to said reciprocally-movable rod.

11. The combination of claim 3 including a depending bracket and a post upstanding therefrom, wherein a rod end of said second push-pull mechanism is pivotally-connected to an ear which is an extension of a cylindrical member, said cylindrical member being concentrically disposed around said post, said cylindrical member being adapted to be rotated relative to said post.

12. The combination of claim 3 including a depending bracket and a post upstanding therefrom, wherein said rod end of said second push-pull mechanism is pivotally-connected to an ear which is an extension of a cylindrical member, said cylindrical member being concentrically disposed around said post, said cylindrical member being adapted to be rotated relative to said post.

13. The combination of claim 12 wherein said cylindrical member includes a second arm extension which is pivotally-connected to a central arm, said central arm comprising a two-part telescopic outer arm and inner arm, said inner arm and said outer arm being interconnected non-rotationally to one another and being adapted to allow the lateral movement, compared to an arcuate movement, of said mower housing to adopt a true lateral movement, compared to an arcuate movement, within the constraints provided by said guide arms, said central arm also being in turn, pivotally connected to said outer arm of said two-part arm.

14. The combination of claim 12 wherein said cylindrical member includes a second arm extension which is pivotally-connected to a central arm, wherein said central arm comprises a two-part telescopic outer arm and inner arm, said inner arm and said outer arm being interconnected non-rotationally to one another and being adapted to allow the lateral movement, compared to an arcuate movement, of said mower housing to adopt a true lateral movement, compared to an arcuate movement, and wherein a rod end of said second push-pull mechanism is pivotally-connected to an ear on said central arm which, in turn, is pivotally-secured to said mower housing.

15. The combination of claim 3 wherein a rod end of said first push-pull mechanism is pivotally-connected to an ear of said outer arm of said two-part arm, said outer arm being pivotally-secured to said mower housing and further wherein a rod end of said first push-pull mechanism is pivotally-connected to an ear of said outer arm of said two-part arm, said arm being pivotally-secured to said mower housing.

16. The combination of a motor-driven vehicle having front wheels and rear wheels and a longitudinally-extending frame bed therebetween, a transversely-mounted powered grass-cutting mower, the mower having a housing and powered grass cutting blades, and a suspended mounting system for mounting the mower to the frame bed, as claimed in claim 1, wherein said suspended mounting system is further characterized in that:

(i) said vertical guidance means also includes a transverse bar which is disposed between said pair of transversely spaced-apart, longitudinally-extending rails which constitute said longitudinally-extending frame bed of said motor-driven vehicle, a plate which is secured to said mower housing, a pair of brackets, each said bracket depending from an associated said rail, and a pair of link arms, each said link arm being connected to a lower portion of an associated said bracket;

(ii) said first powered operating means comprises a first push-pull mechanism including a reciprocally-movable rod and an end which is fixed relative to said reciprocally-movable rod, said fixed end thereof being pivotally-secured to said transverse bar, said rod end of said first push-pull mechanism being pivotally-secured to the top of said plate, and wherein a forward edge of said mower housing plate constitutes another link arm connection between the upper portion of each associated said bracket and the rear edge of said mower housing plate, said first push-pull mechanism being operative to move said mower housing, within the constraints provided by said vertical guidance means, through a finite number of vertical locations between said upper limit and said lower limit; and (iii) said second powered operating means comprises a second push-pull mechanism including a reciprocally-movable rod, an end of said second push-pull mechanism being fixed relative to said reciprocally-movable rod, said fixed end of said second push-pull mechanism being pivotally-secured to one laterally-extending rail, said rod end of said second push-pull mechanism being pivotally-connected to said mower housing;

and still further including:

(iv) relatively-slidable means which are disposed between said mower housing and said plate to assist in relative transverse movement between said mower housing and said plate;

whereby actuation of said second push-pull mechanism moves said mower housing, within the constraints provided by said relatively-slidable means, through a finite number of lateral locations between said left lateral limit and said right lateral limit.

17. The combination of claim 16 wherein said vertical guidance means also includes a parallelogram linkage comprising four brackets in the form of two pairs of brackets, each of said four brackets depending downwardly from an associated one of said laterally-extending rails, four ears in the form of two pairs of ears upstanding from said plate, and linkage arms interconnecting associated brackets and ears.

18. The combination of claim 16, including a lug upstanding from said plate to which said rod end of said first push-pull mechanism is pivotally attached.

19. The combination of claim 16, wherein said fixed end of said second push-pull mechanism is pivotally-connected to an ear which extends laterally-and angularly-downwardly from one of said longitudinally-extending rails; and wherein said rod end of said second push-pull mechanism is pivotally-connected to an ear which is upstanding from a lateral edge of said mower housing which is remote from said laterally-and angularly-downwardly depending ear.

20. The combination of claim 16, wherein lateral edges of said mower housing are provided with securing means, said securing means attaching a first cable which is entrained around one pulley which is rotatably mounted on a rotary shaft of a motor, and a second cable which is entrained around a second pulley which is mounted on said rotary shaft of said motor.

21. The combination of claim 20, wherein one said securing means attaches one end of a drive chain which entrains respectively, a first idler sprocket, a drive sprocket which is splined to said rotary shaft of a motor, and a second idler sprocket, and then is attached to the other said securing means.

22. The combination of claim 16 wherein one of said relatively-slidable means comprises: four pulleys, one of said four pulleys being freely rotatably and dependently mounted at a respective corner of a block for free-wheeling travel on a pair of longitudinally-spaced-part, inverted "L-shaped" or stepped-shaped tracks which are upstanding from lateral edges of said mower housing.

23. The combination of claim 16, wherein said relatively-slidable means comprises:

a pair of U-shaped sliders of low friction material, each of said sliders being dependently mounted to a respective lateral edge of said plate, and a pair of longitudinally-spaced-apart, inverted "L-shaped" or stepped shaped slide bars which are in sliding cooperative relationship to an associated slider.

24. The combination of claim 16, wherein said relatively-slidable means comprises:

a pair of longitudinally-spaced-apart, C-shaped slide blocks which are upstanding from said mower housing, and which are in sliding cooperative relationship to a lateral edge of said plate or to a slider which is dependently secured from a lateral edge of said plate.

25. The combination of claim 16, wherein said relatively-slidable means comprises:

a pair of wheels, each wheel being rotatably-mounted to an associated lateral edge of said plate, and which are laterally extending towards, and being captured within, spaced-apart slide C-rails which are upstanding from said mower housing and which are in relatively-movable cooperative enclosing relationship to an associated said wheel.

26. The combination of claim 16, wherein said relatively-slidable means comprises:

a pair of spaced-apart bogey wheels, each said pair of bogey wheels upstanding from an associated lateral edge of said plate, and spaced-apart inverted C-rails which are upstanding from said mower housing and which are in relatively movable, cooperative enclosing relationship to an associated pair of said spaced-apart bogey wheels.

27. The combination of claim 16, wherein said relatively-slidable means comprises:

a pair of globular sliders, each of said globular sliders being formed of low friction material and being mounted to an associated lateral edge of said plate, and which are laterally extending from spaced-apart slide C-rails which are upstanding from said mower housing towards, and being captured within, and being in cooperative enclosing relatively slidable relationship to, an associated one of said globular sliders.

28. The combination of claim 16, wherein said relatively-slidable means comprises:

a pair of globular sliders, each of said globular sliders being formed of low friction material and upstanding from an associated lateral edge of said plate, and a pair of spaced-apart, inverted C-rails, each of which is upstanding from an associated lateral edge of said mower housing, said rails being in cooperative enclosing relatively slidable relationship to an associated said globular slider.

29. The combination of claim 16, wherein said relatively-slidable means comprises:

two pairs of vertically spaced-apart wheels, each said pair of wheels being rotatably secured to a respective lateral edge of the plate and stepped-shaped slide rails, each of which is upstanding from a lateral edge of said mower housing and which are in cooperative relationship to associated said vertically spaced-apart wheels, and also including a pair of lateral guide wheels, each of said guide wheels being rotatable about a vertical axis and being in rotational cooperation with a lateral face of an associated said stepped-shaped rail.

30. The combination of claim 16, wherein said relatively-slidable means comprises:

a pair of U-shaped sliders of low friction material, each of said sliders being dependently mounted to a respective lateral edge of said plate, and a pair of longitudinally-spaced-apart, inverted "L-shaped" or stepped shaped slide bars which are in sliding cooperative relationship to an associated slider.

31. The combination of claim 16, wherein said relatively-slidable means comprises:

a pair of longitudinally-spaced-apart, C-shaped slide blocks which are upstanding from said mower housing, and which are in sliding cooperative relationship to a lateral edge of said plate or to a slider which is dependently secured from a lateral edge of said plate.

32. The combination of claim 16, wherein said relatively-slidable means comprises:

a pair of wheels, each wheel being rotatably-mounted to an associated lateral edge of said plate, and which are laterally extending towards, and being captured within, spaced-apart slide C-rails which are upstanding from said mower housing and which are in relatively-movable cooperative enclosing relationship to an associated said wheel.

33. The combination of claim 16, wherein said relatively-slidable means comprises:

a pair of spaced-apart bogey wheels, each said pair of bogey wheels upstanding from an associated lateral edge of said plate, and spaced-apart inverted C-rails which are upstanding from said mower housing and which are in relatively movable, cooperative enclosing relationship to an associated pair of said spaced-apart bogey wheels.

34. The combination of claim 16, wherein said relatively-slidable means comprises:

a pair of globular sliders, each of said globular sliders being formed of low friction material and being mounted to an associated lateral edge of said plate, and which are laterally extending from spaced-apart slide C-rails which are upstanding from said mower housing towards, and being captured within, and being in cooperative enclosing relatively slidable relationship to, an associated one of said globular sliders.

35. The combination of claim 16, wherein said relatively-slidable means comprises:

a pair of globular sliders, each of said globular sliders being formed of low friction material and upstanding from an associated lateral edge of said plate, and a pair of spaced-apart, inverted C-rails, each of which is upstanding from an associated lateral edge of said mower housing, said rails being in cooperative enclosing relatively slidable relationship to an associated said globular slider.

36. The combination of claim 16, wherein said relatively-slidable means comprises:

two pairs of vertically spaced-apart wheels, each said pair of wheels being rotatably secured to a respective lateral edge of the plate and stepped-shaped slide rails, each of which is upstanding from a lateral edge of said mower housing and which are in cooperative relationship to associated said vertically spaced-apart wheels, and also including a pair of lateral guide wheels, each of said guide wheels being rotatable about a vertical axis and being in rotational cooperation with a lateral face of an associated said stepped-shaped rail.

37. The combination of claim 36, wherein said relatively slidable means comprises:

a block which is provided with an engaging surface of low friction material which is slidable within a C-shaped track forming said rail, said block including a projecting rod which is freely-vertically slidable in said vertical slots in said brackets.

38. The combination of a motor-driven vehicle having front wheels and rear wheels and a longitudinally-extending frame bed therebetween, a transversely-mounted powered grass-cutting mower, the mower having a housing and powered grass cutting blades, and a suspended mounting system for mounting the mower to the frame bed, as claimed in claim 1, wherein said suspended mounting system further is characterized in that:

(i) said vertical guidance means further includes a laterally outwardly and downwardly depending ear which is secured to one of said transversely-spaced-apart, longitudinally-extending rails constituting said longitudinally-extending frame bed of said motor-driven vehicle, a plate which is secured to said mower housing, and a pair of brackets, each of said brackets depending from an associated one of said longitudinally-extending rails;

(ii) said first powered operating means depends from said brackets and comprises a prime mover which is operatively-connected to a drive gear, said drive gear being in mesh with a vertical gear rack which, in turn, is operatively-associated with said mower housing, whereby actuation of said prime mover is operative to move said mower housing, within the constraints provided by said vertical guidance means, through a finite number of vertical locations between said upper limit and said lower limit;

(iii) said second powered operating means comprises a push-pull mechanism including a reciprocally-movable rod, an end of said push-pull mechanism being fixed relative to said reciprocally-movable rod, said fixed end of said push-pull mechanism being pivotally-secured to said ear, a rod end of said& push-pull mechanism being pivotally-connected to said mower housing;

and still further including:

(iv) relatively slidable means which are disposed between said mower housing and said plate to assist in said relative transverse movement between said mower housing and said frame;

whereby actuation of said push-pull mechanism moves said mower housing, within the constraints provided by said relatively slidable means, through a finite number of lateral locations between said left lateral limit and said right lateral limit.

39. The combination of claim 38 wherein said vertical guidance means also includes a pair of transversely spaced-apart brackets, each of said brackets depending from an associated transversely-spaced-apart, longitudinally-extending rail, each of said brackets including a vertically-extending slot which is operatively connected to slider means which are operatively associated with said rail, whereby said first push-pull mechanism is operative to move said mower housing within the constraints provided by each associated said vertically-extending slot in each said associated bracket through a finite number of vertical locations between said upper limit and a lower limit.

40. The combination of claim 38 wherein said relatively slidable means comprises: a pulley mounted for free wheeling travel upon the vertical flanges of a C-shaped track forming said rail, said pulley including a projecting rod which is freely-vertically-slidable in said vertical slots in said brackets.

41. The combination of claim 38, wherein said relatively slidable means comprises:

a rectangular block having a guide wheel at each of four corners thereof for relative following sliding movement with respect to upper and lower longitudinally-extending edges of one arm of an H-shaped track forming said rail, said block including a projecting rod which is freely vertically slidable in said vertical slots in said brackets.

42. The combination of a motor-driven vehicle having front wheels and rear wheels and a longitudinally-extending frame bed therebetween, a transversely-mounted powered grass-cutting mower, said mower having a housing and powered grass cutting blades, and a suspended mounting system for mounting the mower to the frame bed, as claimed in claim 1, wherein said suspended mounting system further is characterized in that:

(i) said vertical guidance means includes two cross-bars, each of said cross-bars being disposed between an associated said pair of transversely spaced-apart, longitudinally-extending rails which constitute said longitudinally-extending frame bed of said motor-driven vehicle, and two slewably-mounted brackets, an associated one of said slewably-mounted brackets being operatively associated with an associated said cross-bar;

(ii) said first powered operating means comprises a pair of transversely-spaced-apart, first push-pull mechanisms, each of said first push-pull mechanisms including a reciprocally-movable rod, an end of each of said first push-pull mechanisms being fixed relative to a respective said reciprocally-movable rod, said fixed end of each of said first pair of push-pull mechanisms being pivotally-connected to an associated bracket, a rod end of each of said first pair of push-pull mechanisms being pivotally-connected to an associated linkage arm, each said linkage arm being pivotally-connected at one end to an associated one of said brackets, and at the other end to a lateral edge of said mower housing, whereby actuation of said first pair of push-pull mechanisms causes vertical guided movement of said mower housing within the constraints provided by said vertical guidance means through a finite number of vertical locations between said upper limit and said lower limit; and (iii) said second powered operating means comprises a second push-pull mechanism including a reciprocally-movable rod, an end of said second push-pull mechanism being fixed relative to said reciprocally-movable rod, said fixed end of said second push-pull mechanism being pivotally-secured to an associated one of said cross-bars for rotational movement relative thereto, a rod end of said second push-pull mechanism being pivotally-secured to one of said linkage arms, whereby actuation of said second push-pull mechanism moves said mower housing, within the constraints provided by said two pivotally-secured linkage arms, through a finite number of lateral locations between said left lateral limit and said right lateral limit.

43. The combination of claim 42 wherein said rod end of said first push-pull mechanism is pivotally-connected to an ear on a central arm which is pivotally-secured to said mower housing.

44. The combination of claim 42, wherein said pivotal securement of said central arm to said mower housing comprises a shackle which is secured in a vertical orientation to a transversely-extending edge of said mower housing, and an ear extending from said arm, said shackle and said ear having aligned apertures therethrough, and a vertically-extending bolt passing through said aligned apertures through said shackle and said ear.

45. The combination of claim 42 wherein said cross-bar includes a pair of rods and wherein each bracket includes a hollow cylindrical upright portion which is concentrically disposed around an associated said rod.

46. The combination of claim 42, wherein the rearward edge of said mower housing is provided with a pair of laterally-spaced-apart, upstanding posts, each said post being fitted with a bracket, each of said brackets including an upright hollow cylindrical portion which is concentrically disposed around an associate post, each of said brackets including an ear to which said associated linkage arm is pivotally-secured.

* * * * *